US008348727B2

(12) United States Patent
Trautner et al.

(10) Patent No.: US 8,348,727 B2
(45) Date of Patent: Jan. 8, 2013

(54) AIRFLOW ARRANGEMENT FOR A POWER TOOL

(75) Inventors: Paul K. Trautner, Baltimore, MD (US); Phillip T. Miller, Phoenix, MD (US); William F. Gallagher, Stewartstown, PA (US); Michael C. Doyle, Baldwin, MD (US)

(73) Assignee: Black & Decker Inc., Newark, DE (US)

( * ) Notice: Subject to any disclaimer, the term of this patent is extended or adjusted under 35 U.S.C. 154(b) by 64 days.

(21) Appl. No.: 13/116,395

(22) Filed: May 26, 2011

(65) Prior Publication Data

US 2012/0302147 A1 Nov. 29, 2012

(51) Int. Cl.
*B02C 23/18* (2006.01)

(52) U.S. Cl. ........ 451/488; 451/344; 451/357; 451/359; 55/385.1; 15/230.1; 310/62

(58) Field of Classification Search .................. 451/488, 451/344–346, 348, 349, 354–359; 15/230.1; 55/385.1, 405; 310/62, 63
See application file for complete search history.

(56) References Cited

U.S. PATENT DOCUMENTS 1,982,733 A * 12/1934 Forster ............................ 55/405
2,110,494 A * 3/1938 Zimmerman ................ 15/230.1
2,479,941 A * 8/1949 Kummer ...................... 15/230.1
2,661,810 A 12/1953 Heth
2,878,627 A * 3/1959 Morgan ........................ 451/453
3,740,932 A 6/1973 Borsheim
3,829,721 A * 8/1974 Rosenthal, Jr. ................. 310/47
3,973,937 A 8/1976 Petersen
4,197,102 A 4/1980 Decker
4,248,613 A 2/1981 Linhart
4,624,078 A * 11/1986 Van Rijen et al. ............ 451/357
RE33,085 E 10/1989 Petersen
5,022,903 A 6/1991 Decker
5,034,041 A * 7/1991 Austin ......................... 55/385.1
5,059,222 A 10/1991 Smith
5,449,391 A 9/1995 Decker
5,505,756 A 4/1996 Decker
5,656,050 A 8/1997 Moredock
6,110,246 A 8/2000 Eubank
6,264,712 B1 7/2001 Decker
6,280,493 B1 8/2001 Eubank
6,543,549 B1 * 4/2003 Riedl et al. .................... 173/216
6,776,245 B2 * 8/2004 Kristen et al. ................ 173/217
6,878,189 B2 4/2005 Moredock
6,960,124 B2 11/2005 Lee
7,094,138 B2 * 8/2006 Chang ........................... 451/359
7,258,713 B2 8/2007 Eubank
7,308,950 B2 * 12/2007 Faatz et al. .................... 173/217
7,354,226 B2 * 4/2008 Britz ............................... 408/67
7,722,438 B1 * 5/2010 Bevard et al. ................... 451/28
7,988,538 B2 * 8/2011 Trautner et al. ............... 451/344
8,113,922 B2 * 2/2012 Esenwein ..................... 451/359
(Continued)

*Primary Examiner* — George Nguyen
(74) *Attorney, Agent, or Firm* — Kofi Schulterbrandt; Scott B. Markow; Adan Ayala

(57) ABSTRACT

The present invention is directed to an airflow generation and particle dispersion arrangement for a power tool (e.g., an angle grinder). The arrangement includes a motor, an airflow generation assembly, and a particle dispersion assembly. The airflow generation assembly includes a fan driven by the motor. When engaged, the driven fan generates an airstream that is drawn through the power tool. The particle dispersion assembly includes a passive fan that is not driven by the motor, but instead is driven by the airstream. In operation, the passive fan generates centrifugal and mechanical forces sufficient to remove particles from intake air passing through the particle dispersion assembly.

22 Claims, 26 Drawing Sheets

U.S. PATENT DOCUMENTS

| | | | | |
|---|---|---|---|---|
| 2005/0150199 | A1* | 7/2005 | Michele et al. | 55/385.1 |
| 2005/0287938 | A1* | 12/2005 | Kodani et al. | 451/359 |
| 2007/0031248 | A1* | 2/2007 | Hsu et al. | 415/191 |
| 2007/0251198 | A1* | 11/2007 | Witter | 55/300 |
| 2007/0251199 | A1* | 11/2007 | Valentini | 55/385.1 |
| 2008/0090504 | A1* | 4/2008 | Trautner et al. | 451/359 |
| 2009/0302639 | A1* | 12/2009 | Neale | 296/180.1 |
| 2010/0323593 | A1* | 12/2010 | Hoeschele et al. | 451/359 |

* cited by examiner

AIRFLOW ARRANGEMENT FOR A POWER TOOL

FIELD OF THE INVENTION

The present invention is directed toward an airflow arrangement for a power tool and, in particular, to an angle grinder including a cooling fan and a precleaner assembly with a passive fan operable to separate particulates from an intake airstream.

BACKGROUND OF THE INVENTION

The air intake streams of motorized devices such as vehicles, construction equipment, and powered tools often include particulate material. The particulate material, should it reach the internal operating mechanism, can cause substantial damage to the device. It is therefore beneficial to reduce the level of particulate material in the airflow at a point upstream from the operating mechanism (e.g., the motor or other equipment). Air precleaners are typically utilized to separate particulate material from the airstream. Conventional precleaners include a single motor that drives both the cooling fan and the fan of the precleaning device. This configuration not only increases the power requirements for the motor.

It would be desirable to provide an airflow arrangement in which the fan of the precleaning assembly is a passive fan effective to removing particulates from the air stream.

SUMMARY OF THE INVENTION

The present invention is directed to an airflow generation and particle dispersion arrangement for a motorized device such as a power tool (e.g., an angle grinder). The arrangement includes a tool assembly, an airflow generating assembly, a motor assembly and a particle dispersion assembly. The motor assembly drives the airflow generating assembly and the tool assembly. The particle dispersion assembly includes a passive fan configured to remove particulate material from the intake airstream that passes through the particle dispersion assembly. The particulate dispersion assembly is further configured to redirect the intake airstream from a first direction to a second direction within the tool housing. The passive fan is not mechanically driven by the motor assembly (although it could be); instead, it is driven by intake air flowing through the particle dispersion assembly.

In operation, the motor assembly drives a shaft that drives both the tool assembly and the airflow generating assembly. Specifically, the motor assembly drives an active fan that creates an airstream effective to draw intake air from the ambient environment into the tool housing. Upon enter the housing, the intake air is first directed to the particle dispersion assembly. The stream of intake air enters the particulate dispersion assembly in a first direction. It then passes over the blades of the passive fan and rotates the passive fan, which, in turn, removes particulate material from the intake airstream. The cleaned airstream is then redirected in a second direction toward the motor assembly. Finally, the airstream is pulled through a motor assembly and then pushed or expelled through vents in the direction of the gear case.

BRIEF DESCRIPTION OF THE DRAWINGS

Like reference numerals have been used to identify like elements throughout this disclosure.

DETAILED DESCRIPTION OF THE INVENTION

Figure 1:
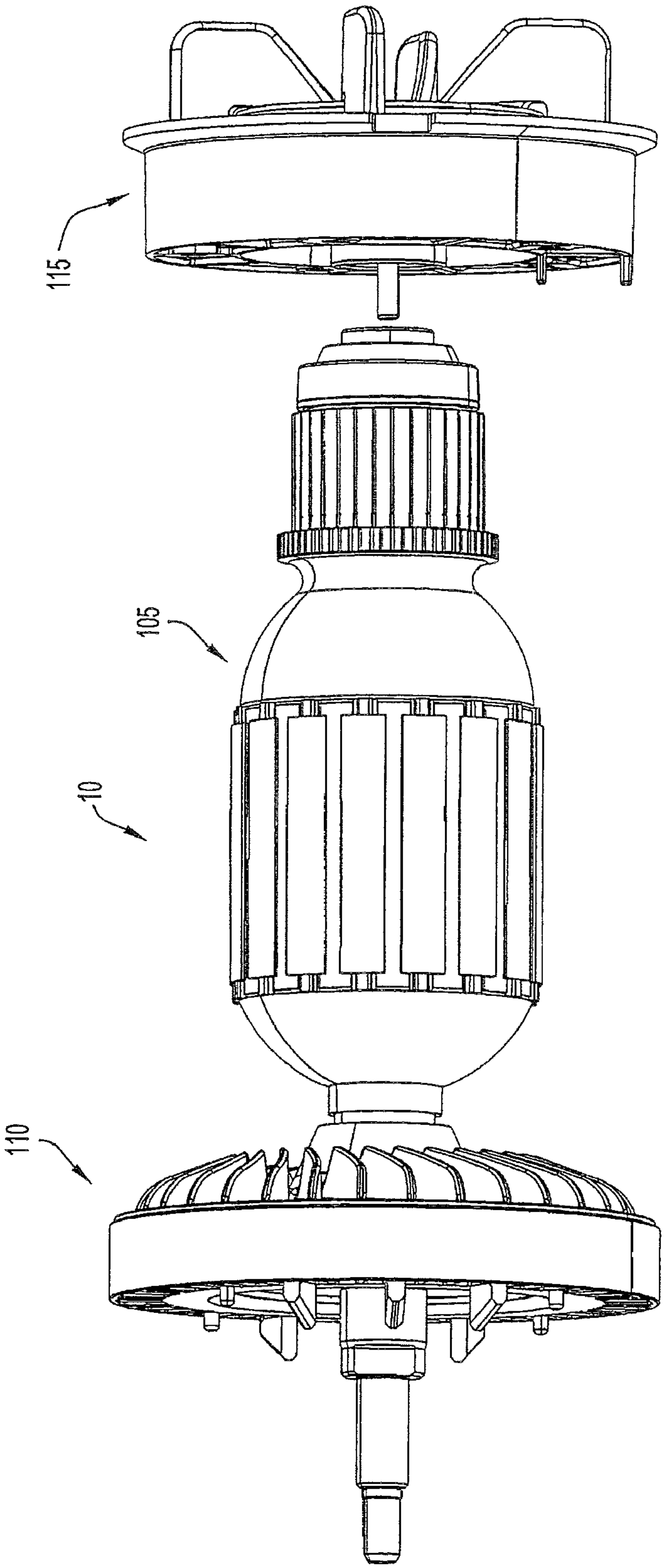
FIG. 1 illustrates a side view in elevation of an airflow apparatus in accordance with an embodiment of the invention.

FIG. 1 illustrates an arrangement for an airflow generation and particle evacuation apparatus in accordance with an embodiment of the invention. As shown, the airflow generation and particle evacuation apparatus 10 includes a motor or armature assembly 105, an airflow generating assembly 110 (also called a cooling fan assembly), and a particle dispersion assembly 115. The assemblies 105, 110, 115 may be generally coaxial, with the airflow generation assembly 110 being disposed forward (downstream) of the motor assembly 105, and the particle assembly 115 being disposed rearward (upstream) of the motor assembly.

Figure 2A:
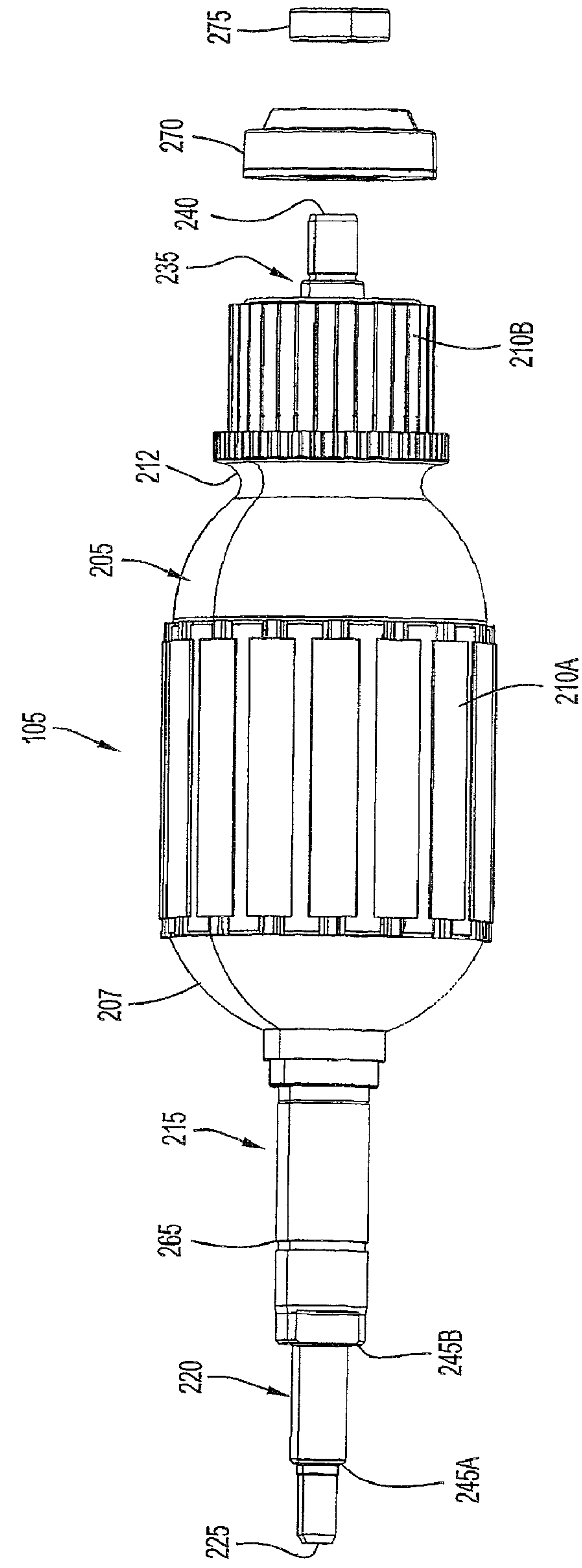
FIG. 2A illustrates an exploded view of the motor assembly of the airflow apparatus shown in FIG. 1.
Figure 2B:
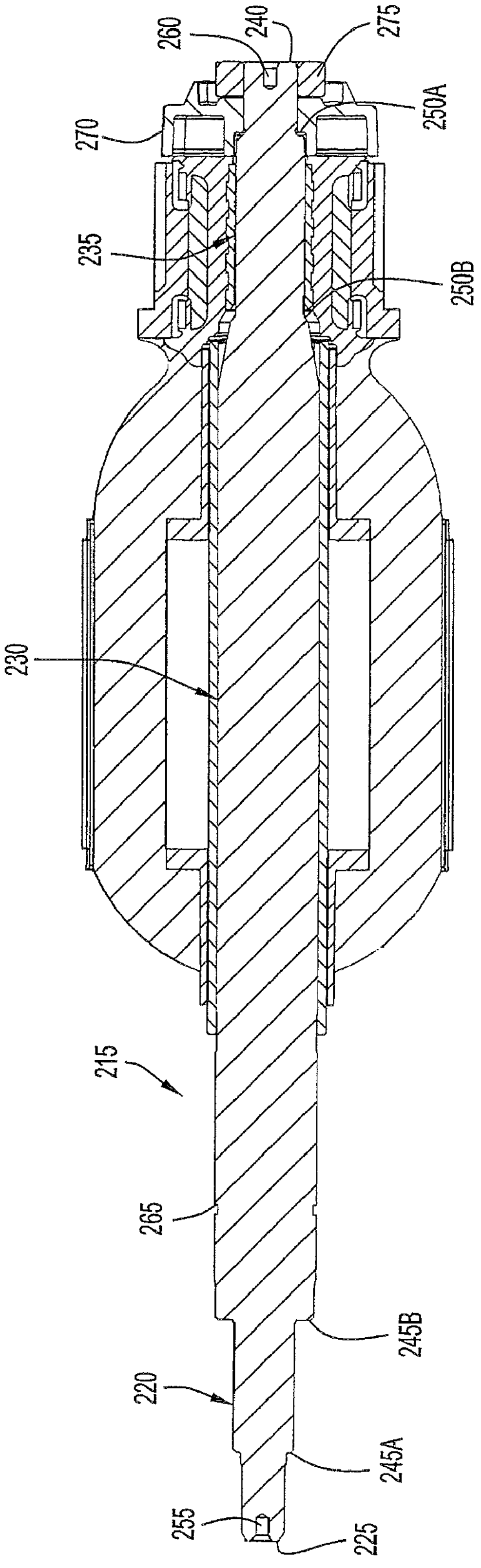
FIG. 2B illustrates a cross-sectional view of the motor assembly of the airflow apparatus shown in FIG. 1.

The motor assembly 105 is configured to drive the fan of airflow generating assembly 110. FIGS. 2A and 2B illustrate the motor assembly 105 in accordance with an embodiment of the present invention. The motor assembly 105 may include any type of motor suitable for its described purpose. By way of example, the motor assembly 105 may include a universal series motor. In the embodiment illustrated, the motor assembly 105 includes a commutator motor with an armature or rotor 205 and a plurality of conducting segments or members circumscribed about the rotor (called a commutator). Specifically, the rotor 205 includes a first or forward rotator portion 207 including a plurality of conductor segments 210A and a second or rearward rotator portion 212 including a plurality of conductor segments 210B. Spring-biased brushes (seen in FIG. 8) contact their associated conducting segments 210A, 210B to provide an electrical connection. An electrical lead may link the brushes to a switch for selective connection with a power source. An exemplary commutator type motor is disclosed in U.S. Patent Application No. 2006/0276114 to Gallagher et al., the disclosure of which is hereby incorporated by reference in its entirety.

The rotor 205 rotates an axle or shaft 215 coaxially disposed therein. The shaft 215 may possess any shape and any dimensions suitable for its described purpose. In the illustrated embodiment, the shaft 215 is in the form of an elongated, generally cylindrical rod having a first or forward (tool facing) portion 220 defining a first or forward end 225, a second or intermediate portion 230, and a third or rearward (handle facing) portion 235 defining a second or rearward end 240. The forward portion 220 of the shaft 215 may include one or more tapers that define generally annular shoulders 245A, 245B. Similarly, the rearward portion 235 of the shaft 215 may include one or more tapers that define generally annular shoulders 250A, 250B.

The forward end 225 of the shaft 215 is configured to mechanically engage and drive the tool assembly of the power tool device. The forward end 225 of the shaft 215 further includes a forward bore 255 generally aligned with the shaft longitudinal axis. The forward bore 255 is configured to mate with a tool drive mechanism (e.g., the gear system of the tool). Similarly, the rearward end 240 of the shaft 215 includes a rearward bore 260 generally aligned with the shaft longitudinal axis. The rearward bore 260 is dimensioned to receive and axially support the pin of the particle dispersion assembly 115. The intermediate shaft portion 230 may further include one or more notches 265 radially circumscribed about the shaft perimeter that serves as a coupling point for components such as the airflow generation assembly 110.

The motor assembly 105 further includes a rearward cap 270 coupled to the rear portion 212 of the rotor 205. The cap 270 is configured to permit passage of the shaft 215 therethrough. In addition, the cap 270 supports a bearing 275 (e.g., an 8×16×5 annular bearing) such that it surrounds the shaft 215 (i.e., the bearing is seated within the cap). The bearing 275 facilitates rotation of the shaft within the cap 270.

The airflow generating assembly 110 is configured to generate a stream of air through the apparatus 10 and, in particular, through the portion of the tool housing containing the motor assembly to serve as motor cooling air. FIGS. 3A-3E illustrate the airflow generating assembly 110 in accordance with an embodiment of the present invention. As shown, the airflow generating assembly 110 includes a driven fan 305 and a stator or baffle 310. The driven fan 305 may be any fan suitable for its described purpose. In the embodiment illustrated, the driven fan 305 is an axial fan including a hub 315 defining a central eye or aperture 320. The central eye 320 receives the shaft 215 of the motor assembly 105, fixedly coupling the driven fan 305 to the forward portion 220 of the shaft 215 (e.g., proximate notch 265) such that rotation of the shaft imparts rotation to the driven fan. The hub 315, moreover, may possess any shape and dimensions suitable for its described purpose. In the embodiment illustrated, the hub 315 possesses a frustoconical shape, with a narrowing portion 322 protruding axially outward from the rearward side 323 of the driven fan 305.

The forward side 324 of the driven fan 305 includes a generally annular inner wall 330 that surrounds the hub 315 to define a first or inner generally annular gap 335 between the hub and the inner wall. The forward side 324 further includes a generally annular outer wall 340 that surrounds the inner wall 330 to define a second or outer generally annular gap 345 between the inner wall and the outer wall. Each of the inner wall 330, the outer wall 340, and the hub 315 may be generally concentric. A first plurality of ribs 350 is angularly spaced about the first gap 335, extending radially from the hub 315 to the inner wall 330. Similarly, a second plurality of ribs 355 is angularly spaced about the second gap 345, extending radially from the inner wall 330 to the outer wall 340. The ribs 350, 355 provide additional strength to the fan structure, resisting torsional forces created during rotation. A web of material connects the ribs 350, 355, effectively closing the gaps 335, 345 to prevent air from traversing therethrough.

A plurality of blades 360 surrounds the hub 315 extending from the fan rearward side 323. The blades 360 may possess any shape and any dimensions suitable for their described purpose. In particular, the blades 360 may possess any degree of curvature and pitch to provide the desired airflow characteristics. In the embodiment shown, the blades 360 possess a slightly arcuate shape, and are oriented at an angle offset from orthogonal with respect to the hub 315. With this configuration, rotation of the driven fan 305 generates a stream of air in the axial direction (i.e., generally parallel to the hub axis).

Figure 3A:
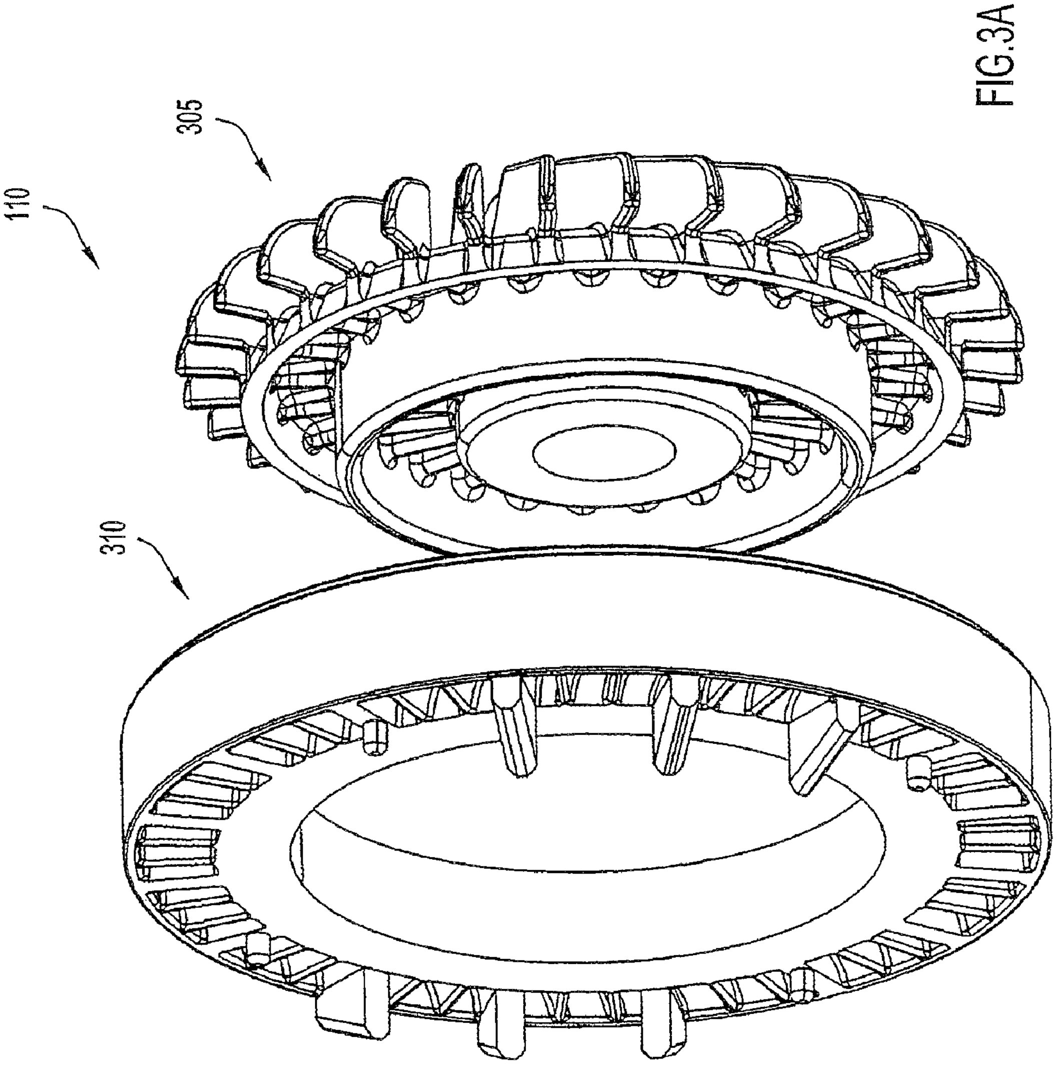
FIG. 3A illustrates an exploded view of an airflow generation assembly in accordance with an embodiment of the invention.
Figure 3B:
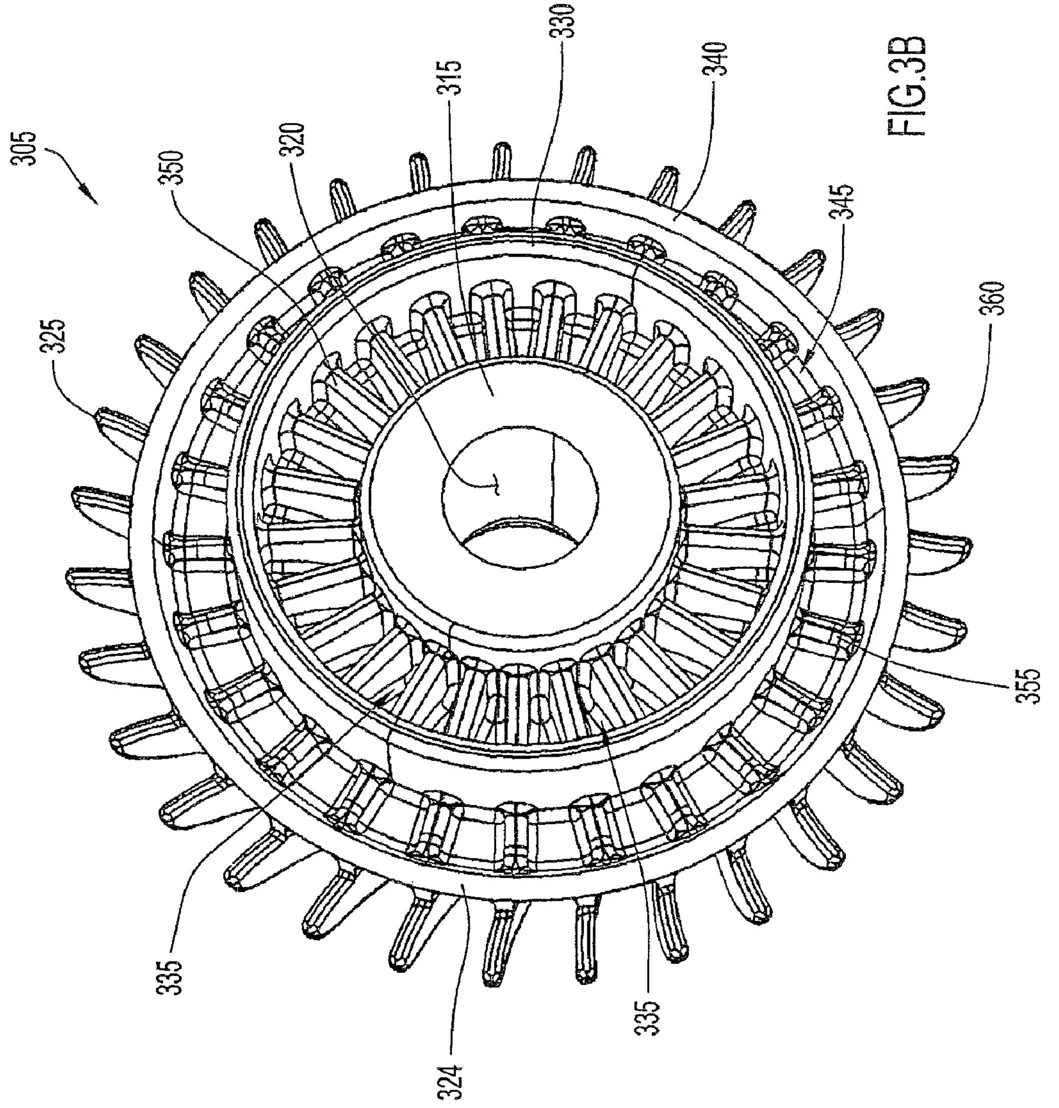
FIG. 3B illustrates a front perspective view of the driven fan from the airflow generation assembly shown in FIG. 3A, viewed in isolation.
Figure 3C:
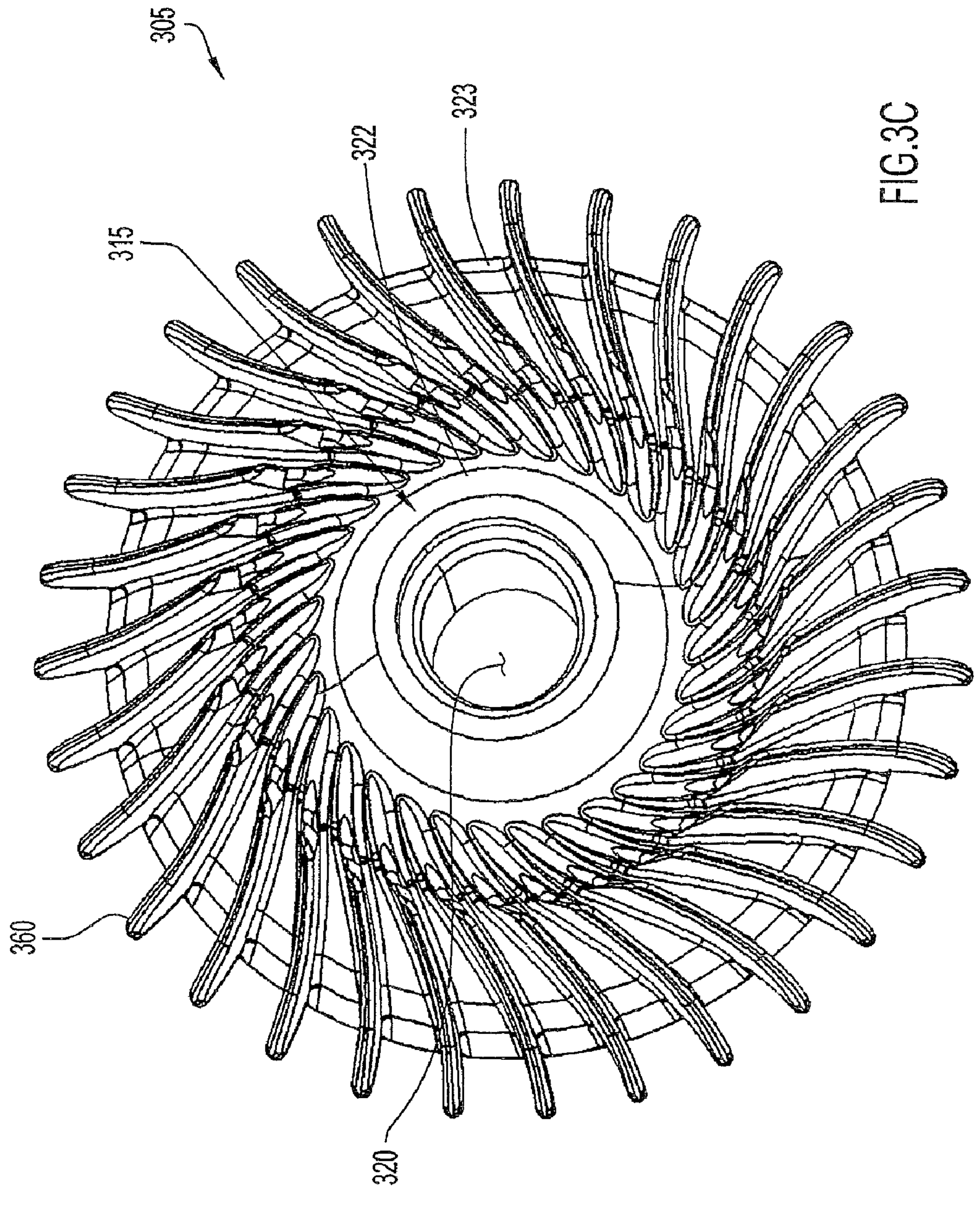
FIG. 3C illustrates a rear perspective view of the driven fan shown in FIG. 3B.
Figure 3D:
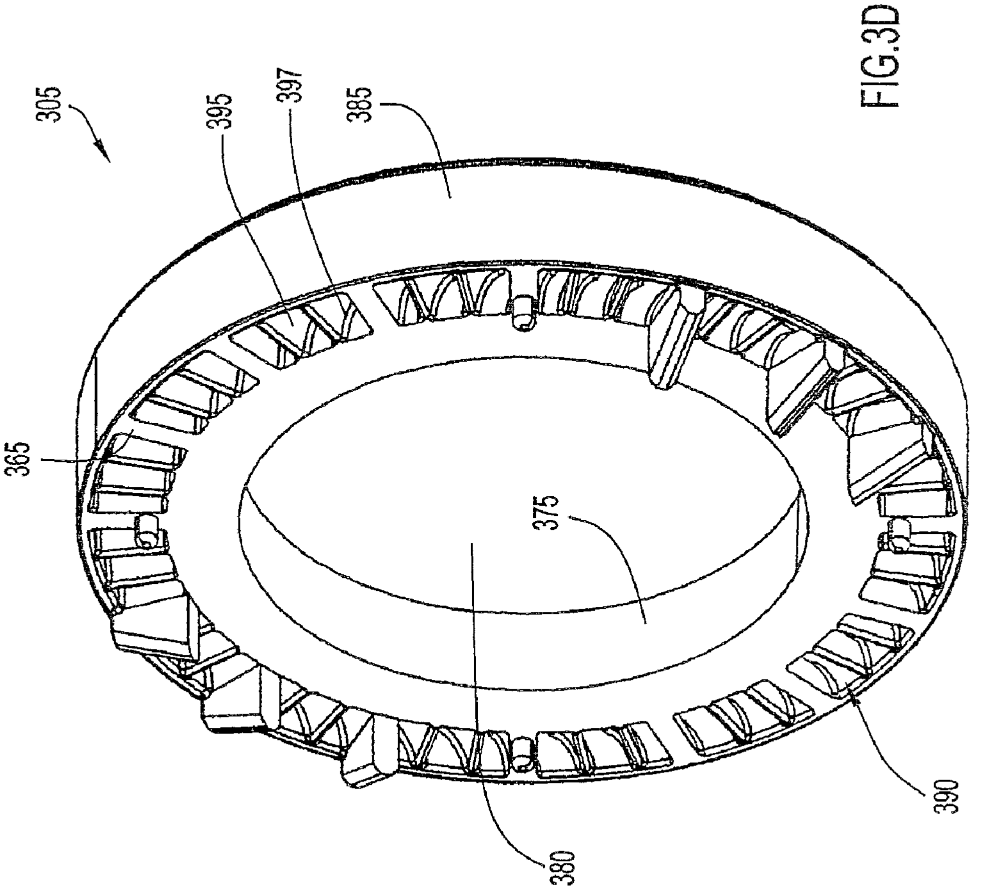
FIG. 3D illustrates a front perspective view of the baffle of the airflow generation assembly, viewed in isolation.
Figure 3E:
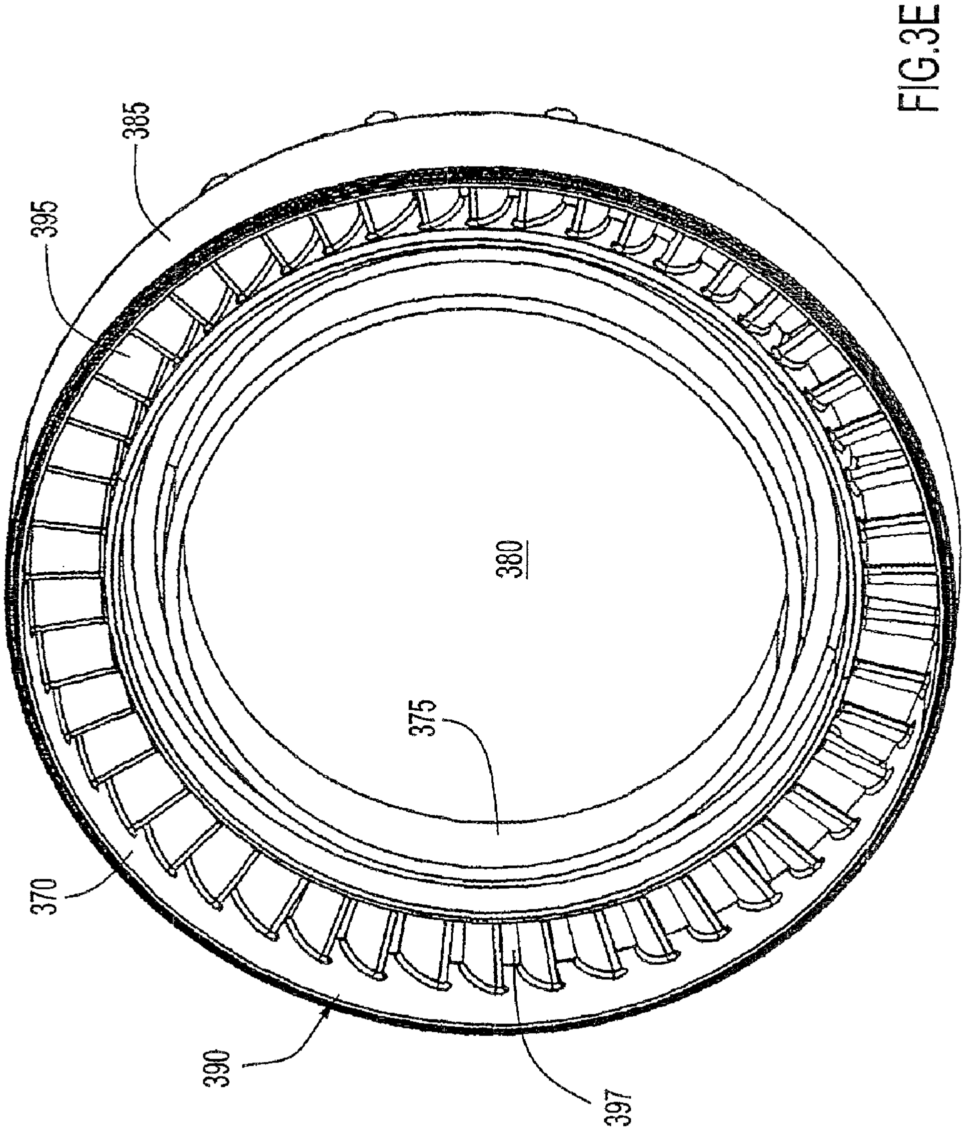
FIG. 3E illustrates a rear perspective view of the baffle shown in FIG. 3D.

The baffle 310 is configured to direct the flow of air generated by then driven fan 305. Referring to FIGS. 3D and 3E, the baffle 310 includes a forward side 365 and a rearward side 370. A generally annular inner wall 375 defines a central aperture 380, while a generally annular outer wall 385 defines the perimeter of the baffle 310. The inner wall 375 and the outer wall 385 are coaxial; additionally, the inner wall is spaced from the outer wall such that a generally annular gap 390 is formed between the walls. A plurality of slats or ribs 395 is angularly spaced about the gap 390 to define openings or vents 397 that permit airflow therethrough. As illustrated, the slats 395 may oriented angularly (offset from normal) to direct airflow about the perimeter of the baffle 310. The baffle 310 may be fixedly coupled to the housing of the power tool containing the airflow apparatus 10.

In operation, the driven fan 305 is positioned to the rearward side 370 of the baffle 310 such that the hub 315 and the inner wall 330 of the fan 305 are positioned within the central aperture 380 of the baffle 310. In this orientation, the closed gaps 335, 345 of the fan 305 prevent airflow from traveling through the baffle central aperture 380. The motor shaft 215 extends through the fan hub 315. The shaft 215 is secured to the driven fan 305 such that activation of the motor assembly 105 drives the rotation of the fan (via rotation of the shaft). The rotating fan blades 360 generate an flow of air along the longitudinal axis of the tool that is directed into the vents 397 and along the perimeter of the baffle 310 and out of the housing through vents toward the gear assembly.

Figure 4A:
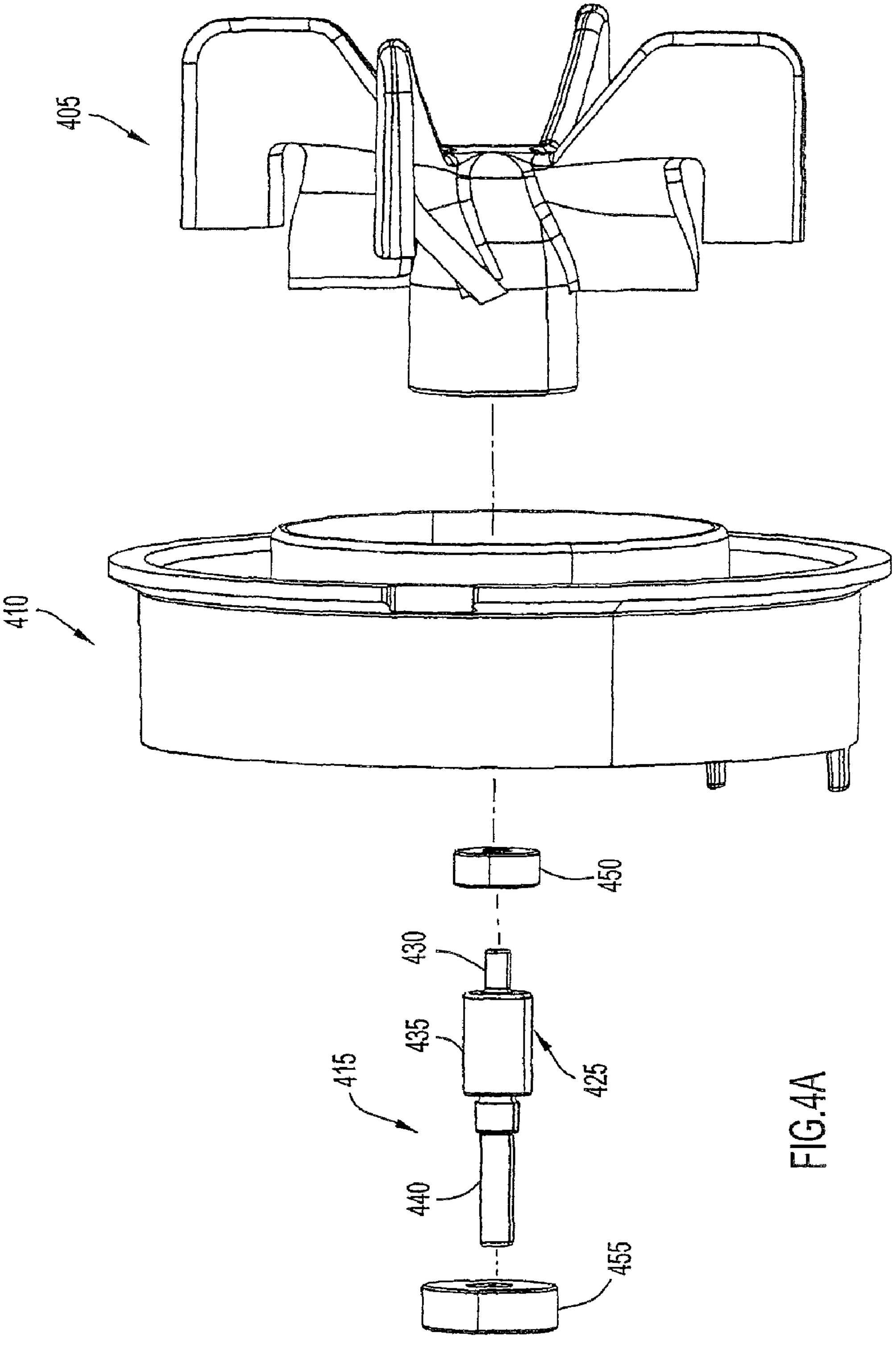
FIG. 4A illustrates an exploded view of the particle dispersion assembly in accordance with an embodiment of the invention.
Figure 4B:
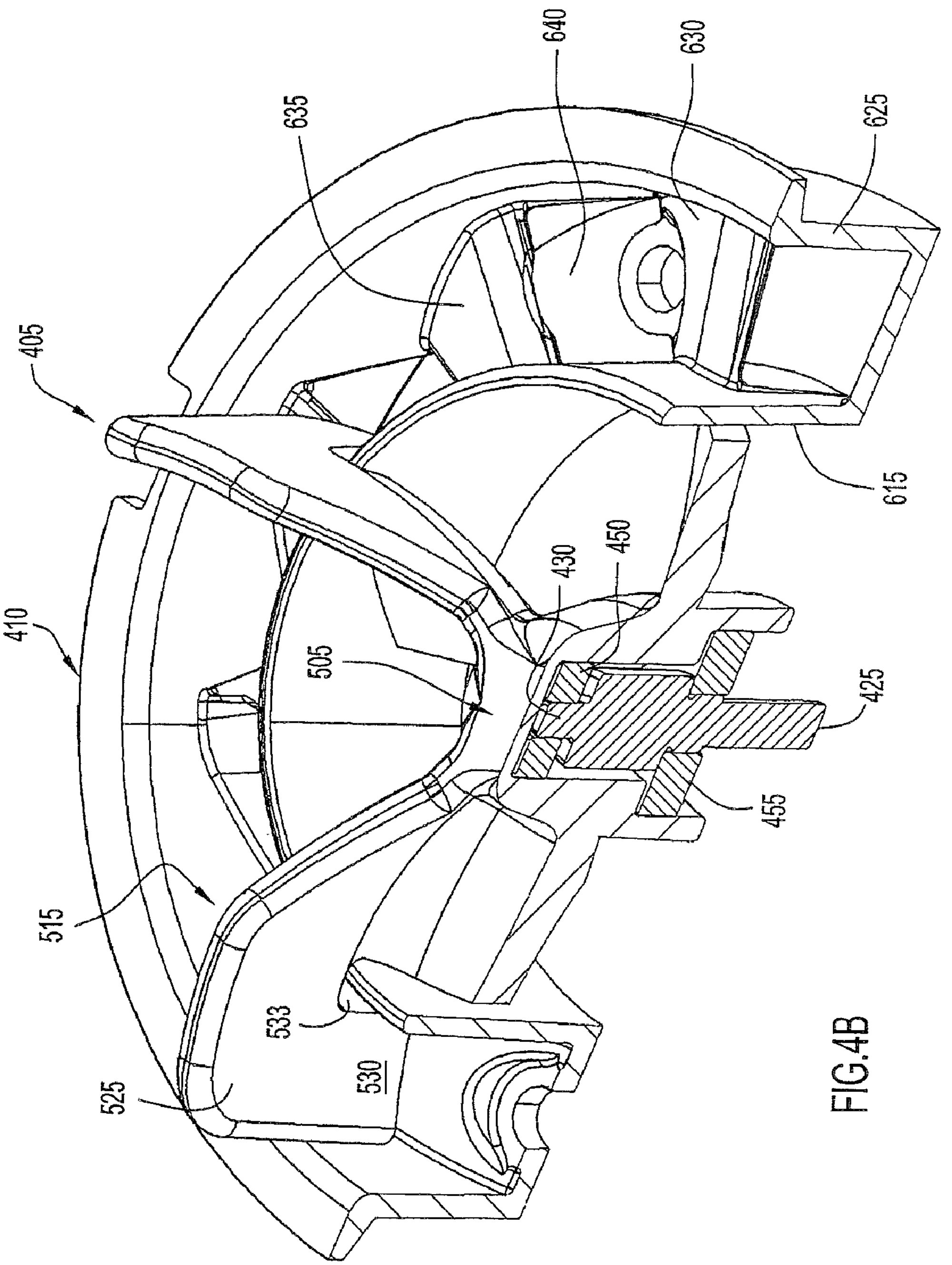
FIG. 4B illustrates a cross sectional view of the particle dispersion assembly illustrated in FIG. 4A.
Figure 5A:
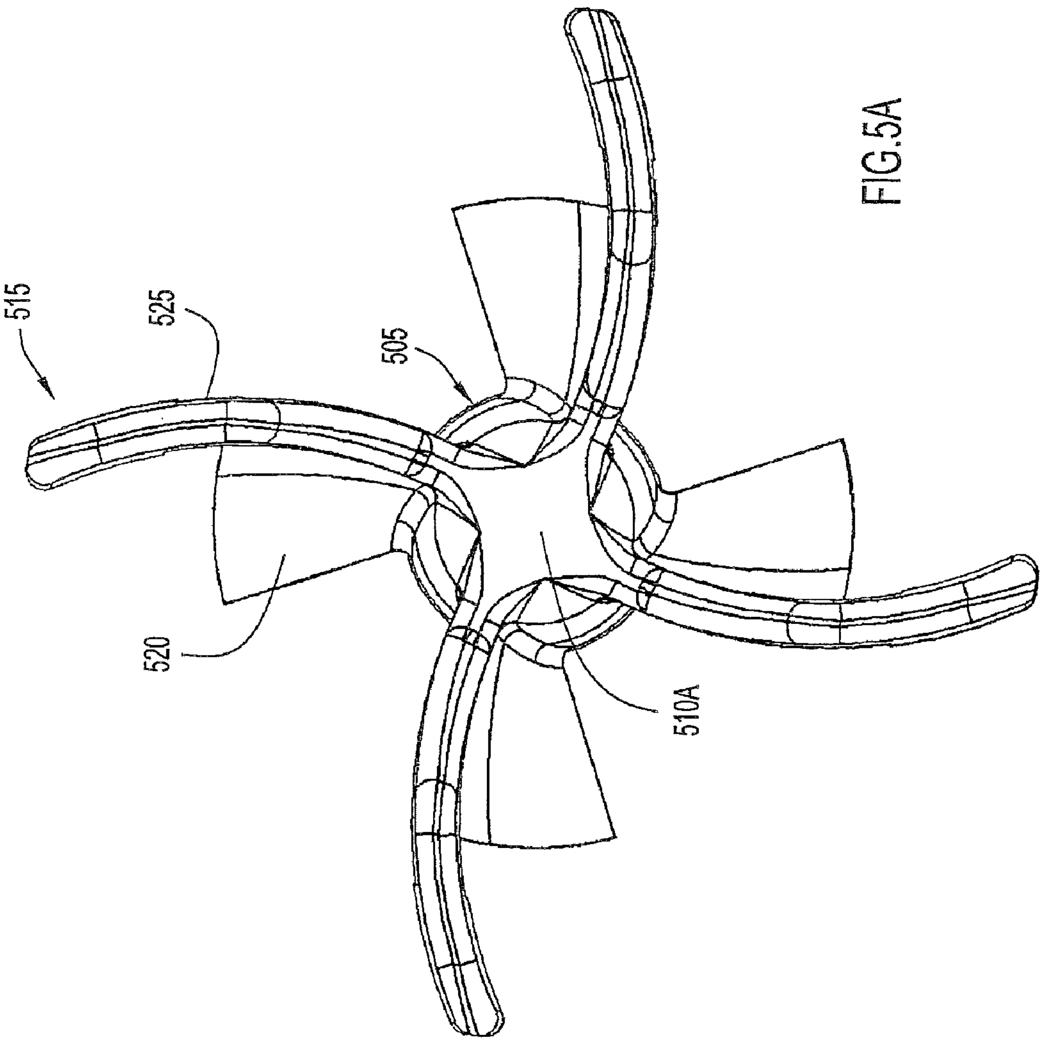
FIG. 5A illustrates an isolated, top plan view of the passive fan of the particle dispersion assembly in accordance with an embodiment of the invention.
Figure 5B:
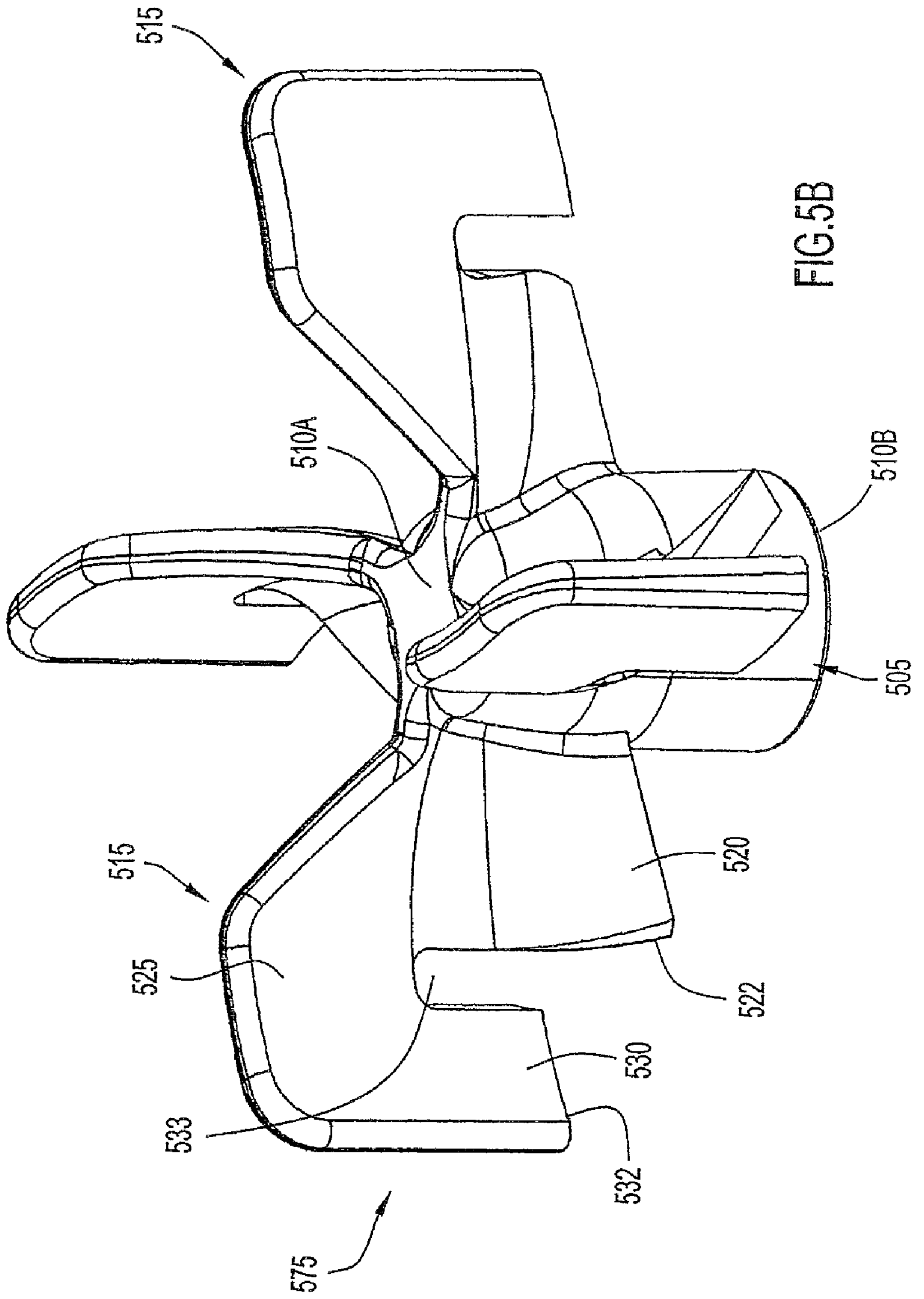
FIG. 5B illustrates a perspective view of the passive fan shown in FIG. 5A.
Figure 5D:
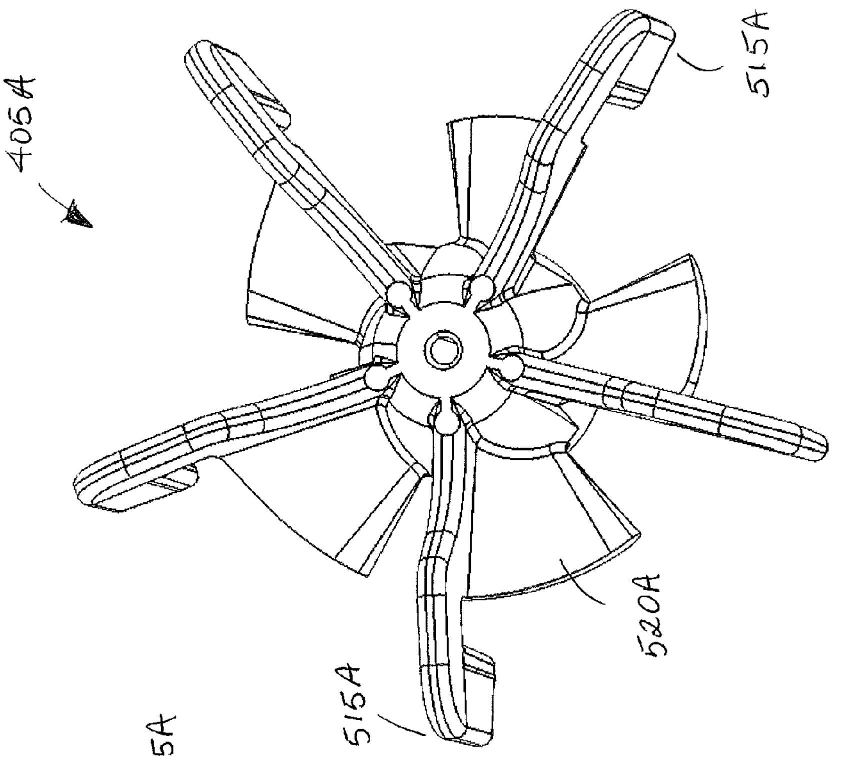
FIG. 5D illustrates a perspective view of the passive fan shown in FIG. 5C.
Figure 5C:
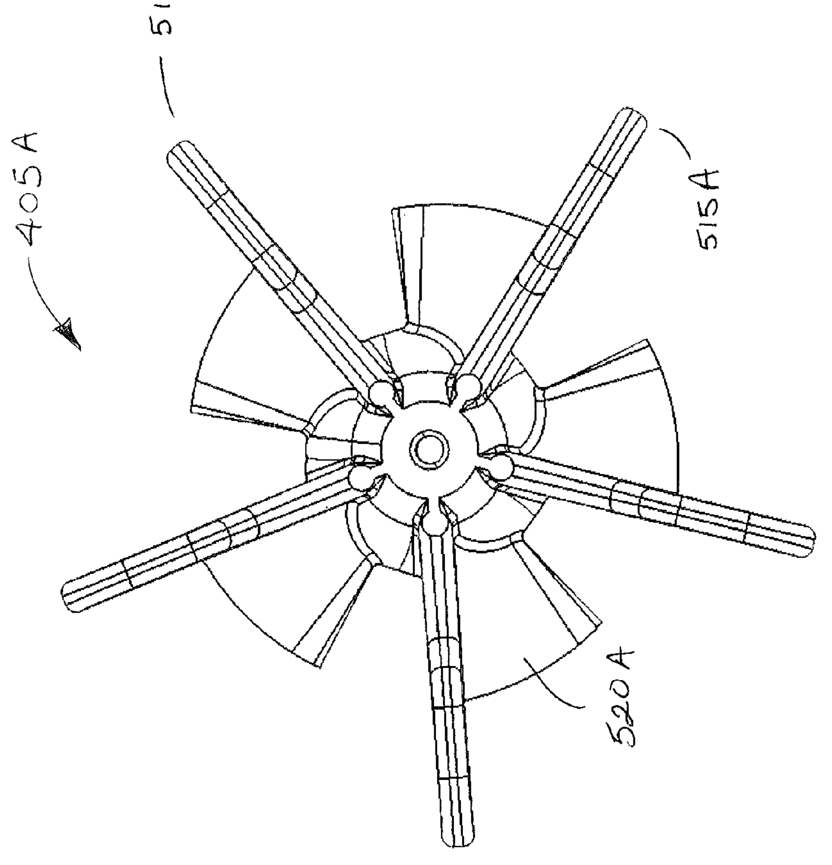
FIG. 5C illustrates an isolated, top plan view of an alternate embodiment of the passive fan of the particle dispersion assembly of 4C.
Figure 5E:
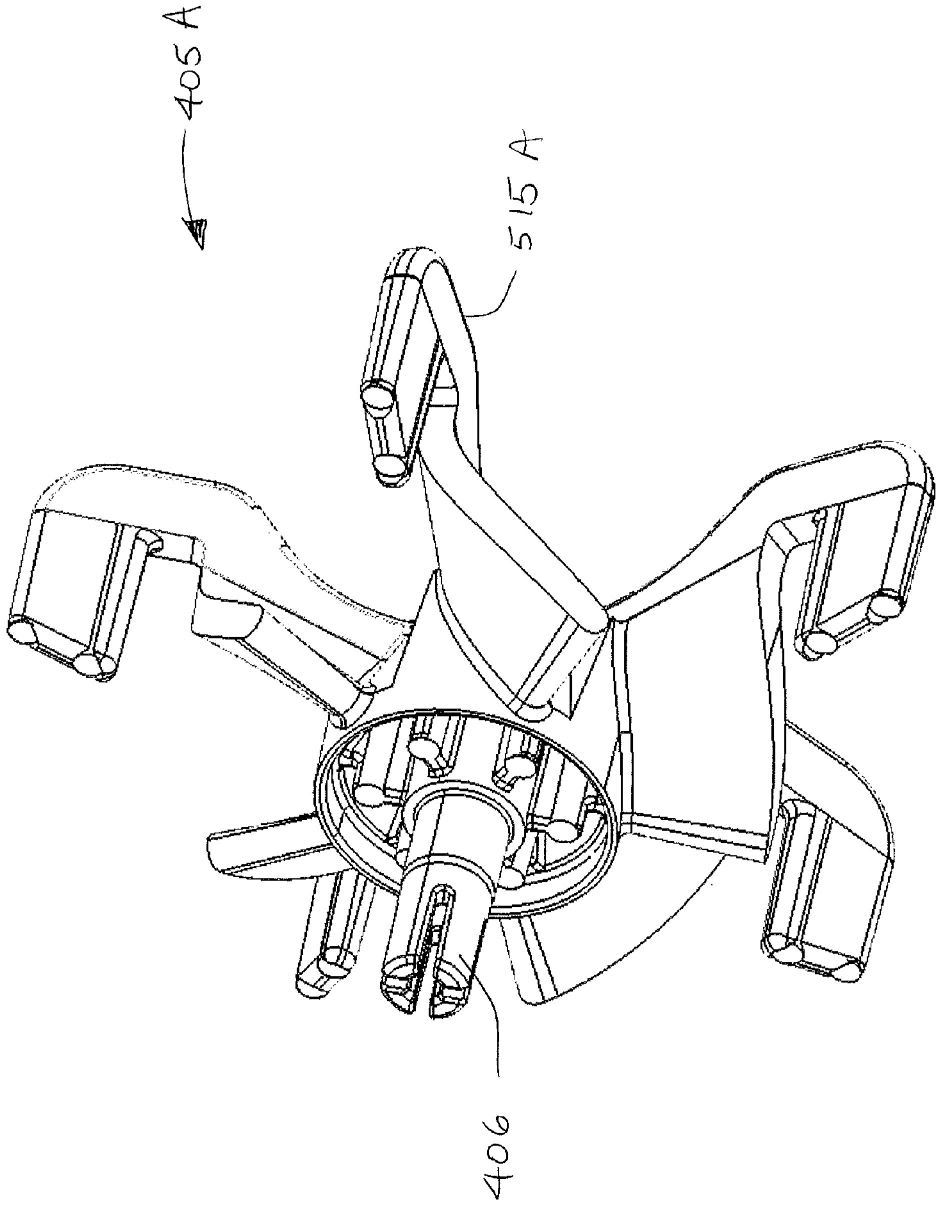
FIG. 5E illustrates a rear perspective view of the passive fan shown in FIGS. 5C and 5D.

The particle separation/dispersion assembly 115 is configured to centrifugally deflect particles from the airstream, as well as to evacuate the deflected particles from the housing containing the apparatus 10. Referring to FIGS. 4A and 4B, the particle dispersion assembly 115 includes a passive fan 405, a stator or baffle 410, and a bearing assembly 415. As seen in FIGS. 5A and 5B, the passive fan 405 includes a central hub 505 defined by a hollow cylinder having a closed rearward end 510A and an opened forward end 510B. Plural deflection vanes or blades 515 are angularly spaced about the hub 505. The deflection blades 515 may possess any shape and dimensions suitable for their described purpose. In particular, the deflection blades 365 may possess any curvature and pitch effective to remove particles from an airstream and/or to direct the flow of the airstream in a predetermined direction. FIG. 5C shows an alternate embodiment of passive fan 405A having straight or generally straight blades 515A and FIGS. 5D and 5E show the FIG. 5C fan in respective front and rear perspective.

In the illustrated embodiment, each deflection blade 515 includes a first or axial portion 520 extending generally axially along the hub 505, and a second or radial portion 525 extending generally radially from the hub. Specifically, the axial blade portion 520 may extend axially along the exterior surface of the hub 505 from its rearward end 510A to the longitudinal midpoint of the hub to define an outer radial edge 522. The axial blade portion 520, moreover, may curve radially at some desired pitch as it extends along the hub 505. The radial blade portion 525 extends rearward and radially outward from the hub 505 such that it terminates beyond the radial extent of the axial blade portion 520. The distal end of the radial blade portion 525 includes a hook 530 with a generally squared end 532. The hook 530 extends axially forward (toward the forward end 510B of the hub 505) such that the hook is oriented generally parallel to the longitudinal axis of the hub 505. With this configuration, the hook 530 is spaced from the outer radial edge 522 of the axial portion 520 to define a notch or groove 533 that separates the hook 530 from the axial blade portion 520. This configuration further positions the hook 530 and the axial blade portion 520 at predetermined radial positions with respect to the hub 505, which, in turn, positions the hook 530 and the axial portion 520 at predetermined locations with respect to the baffle 410 (explained in greater detail below).

The baffle 410 is configured to direct intake air into contact with the blades 515 of the passive fan 405. The baffle 410 may possess any size and dimensions suitable for its described purpose. Referring to the embodiment illustrated in FIGS. 6A and 6B, the baffle 410 may be in the form of an annular structure having a forward side 605 and a rearward side 610, and including a generally annular inner wall 615 that defines a central aperture 620. The baffle 410 further includes a generally annular outer wall 625 that defines the baffle perimeter. The inner 615 and outer 625 walls are generally coaxial, and are spaced such that a generally annular channel 630 is defined between the inner wall 615 and the outer wall 625. The channel 630 includes a series of angled slats or ramps 635 angularly spaced along the channel 630 to define a plurality openings or vents 640 that permit air to flow outward from the central aperture 620 and along the channel 630. The slats 635 may be offset from normal within the channel 630 such that air passing through the vents is directed in the same direction along the channel 530. The baffle 410 may secured within the housing that contains the apparatus 10.

The bearing assembly 415 is configured to provide free rotational movement of the passive fan 405 about its rotational axis. Referring back the FIGS. 4A-C, the bearing assembly 415 includes a pin 425 having a first or rearward portion 430, a second or intermediate portion 435, and a third or forward portion 440. The pin 425 and its portions 430, 435, 440 may possess any shape and dimensions suitable for their respective described purposes. In the illustrated embodiment, each portion 430, 435, 440 of the pin 425 may be in the form of a cylinder, having a generally circular cross section. Regarding the relative diameter of the various portions 430, 435, 440, the first portion 430 may possess the smallest diameter of the portions, the second portion 435 may possess the largest diameter of the portions, and the third portion 440 may possess a diameter intermediate the diameters of the first and second portions. Regarding axial length, the first portion 430 may possess the shortest length of the portions, the second portion 435 may possess a length longer than the first portion but shorter than the third portion, and the third portion 440 may possess the longest length of the portions.

The bearing assembly 415 further includes one or more bearings configured to permit free rotation of the passive fan 405 about its rotational axis. Specifically, the bearing assembly 415 includes a first or rearward bearing 450 (e.g., a 3×10×4 annular bearing) mounted on the first portion 430 of the pin 425, and a second or rearward bearing 455 (e.g., a 5×16×5 annular bearing) mounted on the third portion 440 of the pin. As seen best in FIG. 4B, the bearing assembly 415 is positioned/mounted within the hub 505 of the passive fan 405, permitting free rotation of the passive fan about its axis. The passive fan 405 is rotatble coupled to the baffle 410, with the axial blade portion 520 being positioned within the central aperture 620 of the baffle and the hook 530 of the radial blade portion 515 being positioned within the channel 630 of the baffle. The inner wall 615, moreover, is positioned within the groove 533 of the deflection blade 515. The third portion 440 of the pin 425, moreover, is seated and freely rotatable within the bore 260 of the motor shaft 215.

Figure 4C:
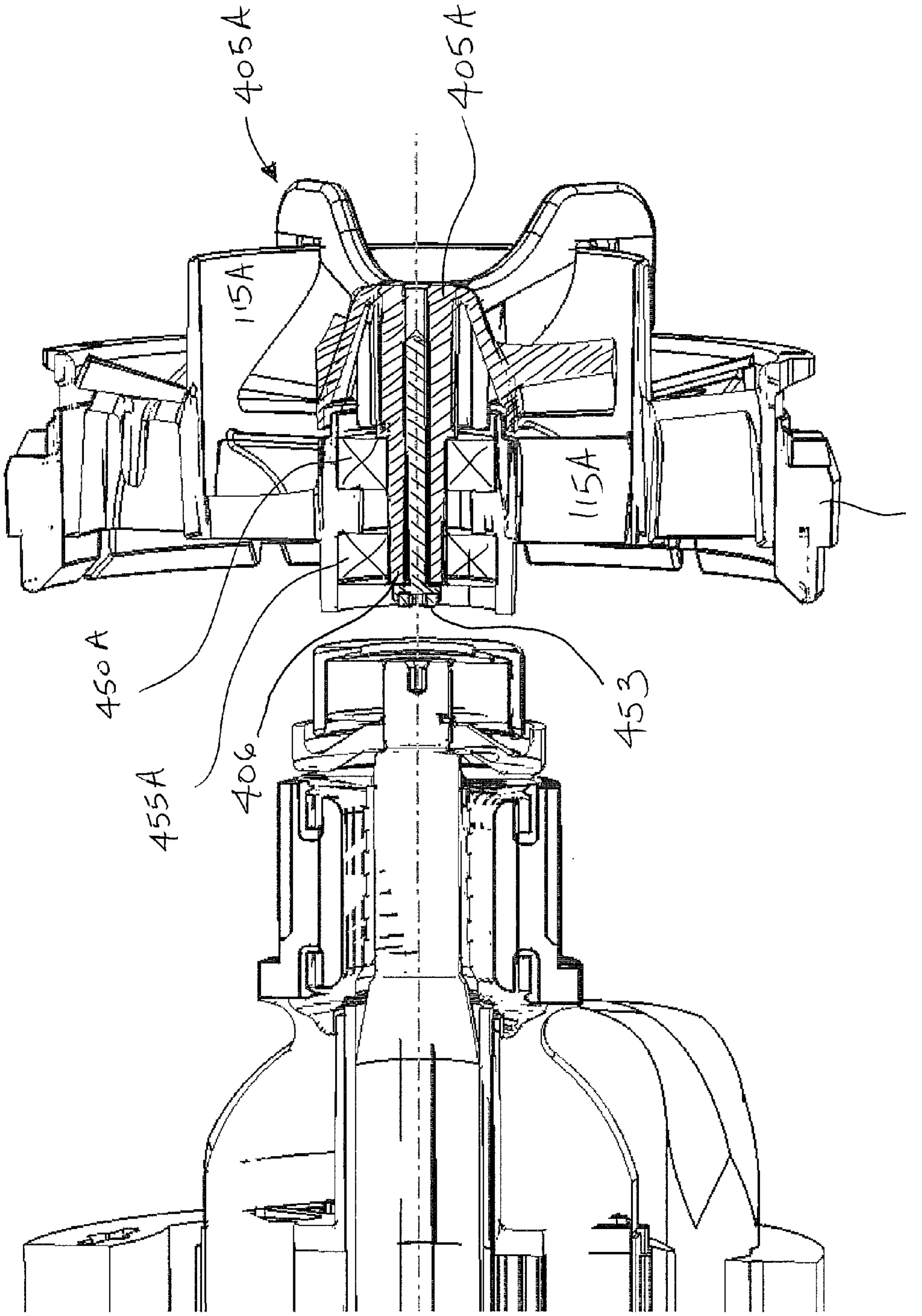
FIG. 4C illustrates a cross sectional view of an alternate embodiment to the embodiment of the particle dispersion assembly of FIG. 4B.

FIG. 4C shows an alternate embodiment to the bearing support structure of FIG. 4A for passive fan 405. In FIG. 4C, a hollow portion 406 of passive fan 405A extends into inner bearing 455A and outer bearing 450A. A fastener 453 is inserted (e.g., threadably) into and opening in hollow portion 406 to expand an outer surface of hollow portion 406 into friction contact with inner surfaces of inner and outer bearings 455A and 450A.

With this configuration, the passive fan 405 is free to rotate about its axis, with the rotation of the deflection blades 515 driven by the air flowing through the particle dispersion assembly 115 (i.e., by the intake airstream from the ambient environment). That is, the passive fan 405 is not mechanically or electrically interconnected to the motor assembly 105—the rotation of the shaft 215 does not directly drive the rotation of the passive fan. Instead, the flow of air traveling through the housing drives the deflection blades 515 (and specifically, the blade portions 520, 525), causing the passive fan 405 to rotate about its axis. This provides a passive fan 405 that is self regulating in that the rotational speed of the passive fan will automatically adjust depending on the amount of air drawn through the particle dispersion assembly 115 by the motor assembly 105.

As the passive fan 405 rotates, the deflection blades 515 create multiple airflow patterns. The axial blade portions 520 create an axial flow that directs air forward, through the central aperture 620 of the baffle 410. In addition, both the axial blade portion 520 and the radial blade portion 525 cooperate to directly and indirectly remove particulate material suspended within an airstream. Specifically, the hooks 530 of the radial blade portion 525 acts as sweepers, physically contacting particles suspended in the airstream, directing the particles towards a housing discharge/exhaust port disposed on the housing containing the apparatus (discussed in greater detail below). In addition, the deflection blades 515 generate a twisting, rotational (cyclonic or swirl pattern) that applies centrifugal and other forces to particles passing through the particle dispersion assembly 115. The centrifugal forces urge any artifacts, particles, or dust entering the particle dispersion assembly 115 radially outward, toward the interior wall of the housing and to the discharge/exhaust port.

Figure 6A:
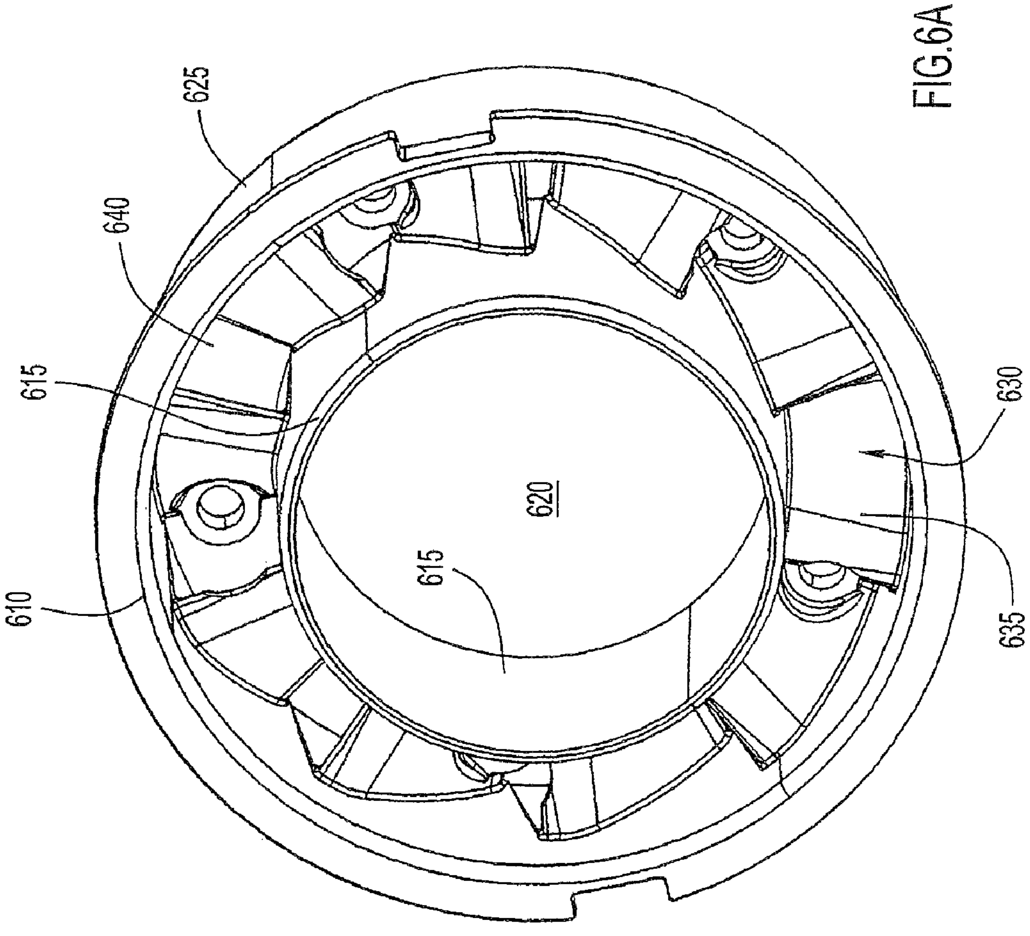
FIG. 6A illustrates an isolated, rear perspective view of the baffle of particle dispersion assembly in accordance with an embodiment of the invention.
Figure 6B:
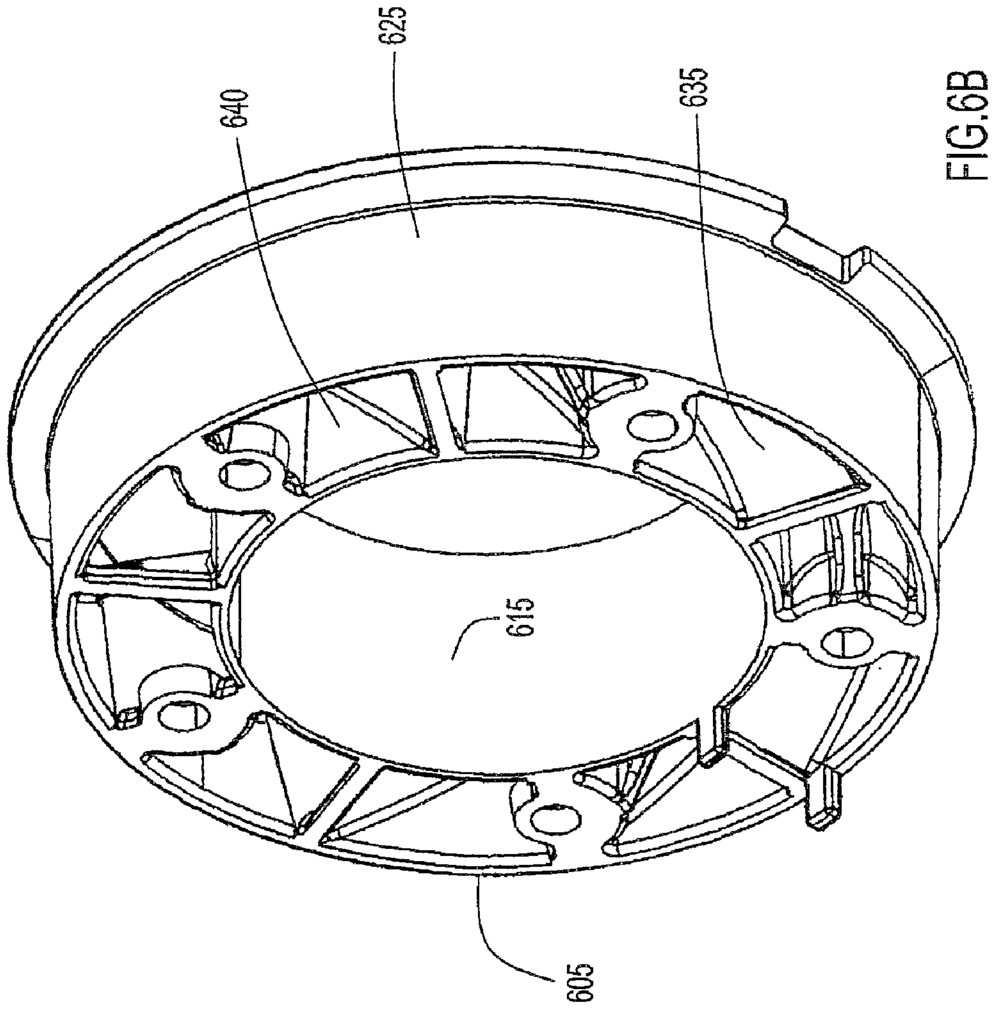
FIG. 6B illustrates a front perspective view of the baffle shown in FIG. 6A.
Figure 6D:
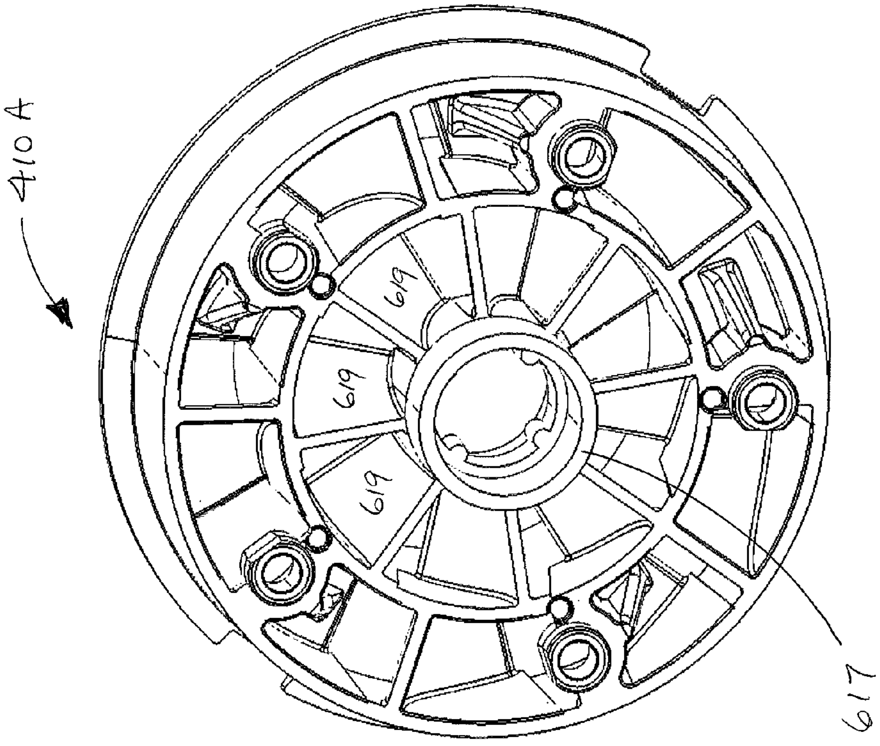
FIG. 6D illustrates a front perspective view of the baffle shown in FIG. 6C.
Figure 6C:
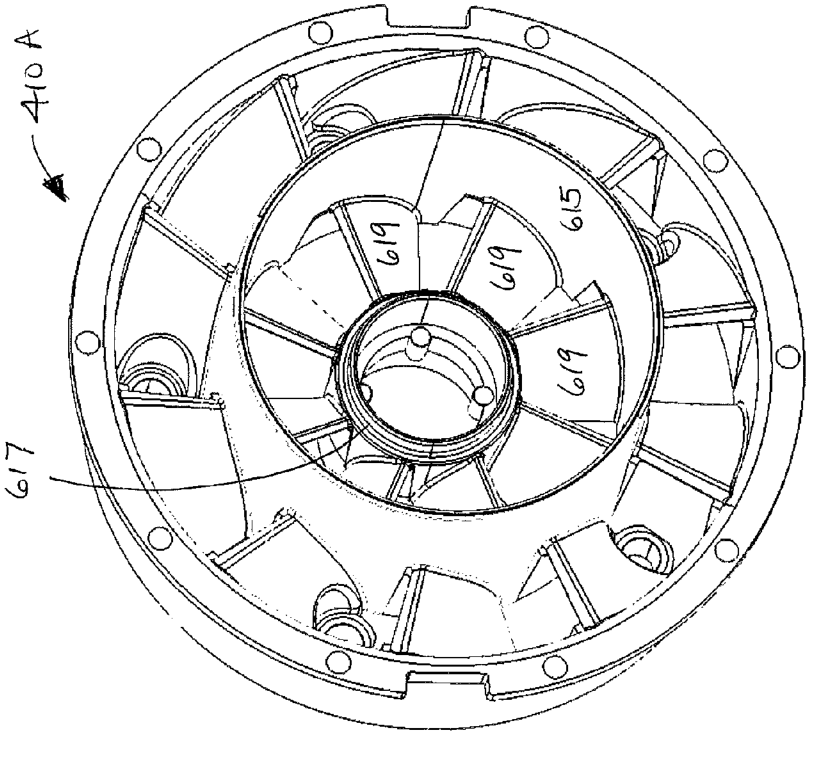
FIG. 6C illustrates an isolated, rear perspective view of the baffle of particle dispersion assembly of FIG. 4C.

The baffle 410 which is illustrated in FIGS. 6A and 6B may also include a bearing support hub 617 and air redirection fins 619 as shown in FIGS. 6C and 6D. Baffle 410A includes a plurality of air redirection fins 619 extend radially inward from annular inner wall 615. The inner ends of each air redirection fin 619 connects to and supports bearing support hub 617. Bearing support hub 617 supports a set of bearings 455A and 450A as shown in FIG. 4C and discussed above. As air passes over the swirling passive fan 405A, the air swirls toward and into contact with air redirection fins 619. The stationary air redirection fins 619 operate to redirect swirling air which flows off a trailing edge of the axial portion 520 of the fan blades. The air is redirected from a swirling pattern to a more longitudinal flow direction along the longitudinally axis of the tool. In other words, air redirection fins 619 straighten the swirling air so that the air flows in a longitudinal direction of the tool toward the motor assembly 105.

Figure 7A:
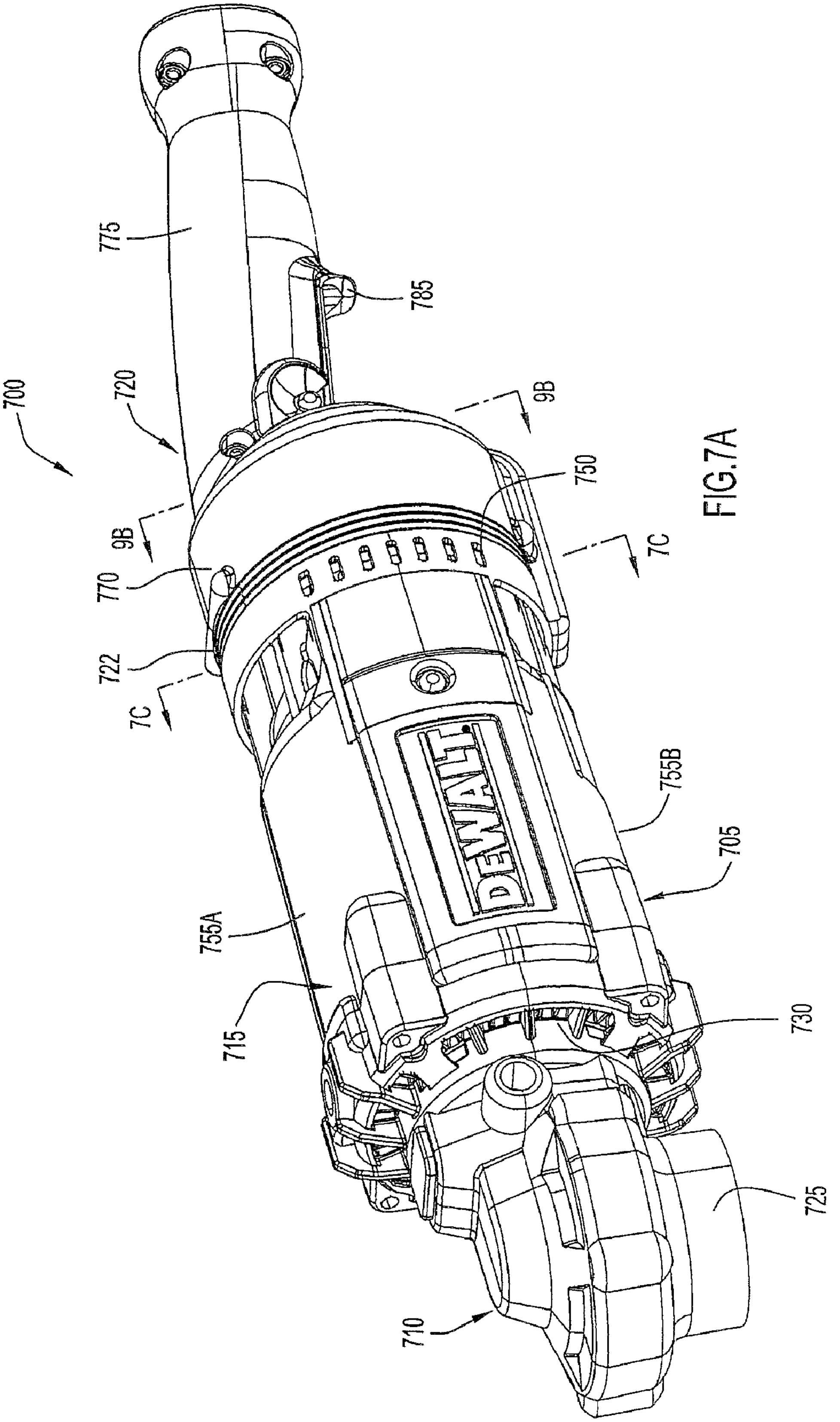
FIG. 7A illustrates a side view of power tool including the airflow apparatus of FIG. 1, showing an angle grinder device.
Figure 7B:
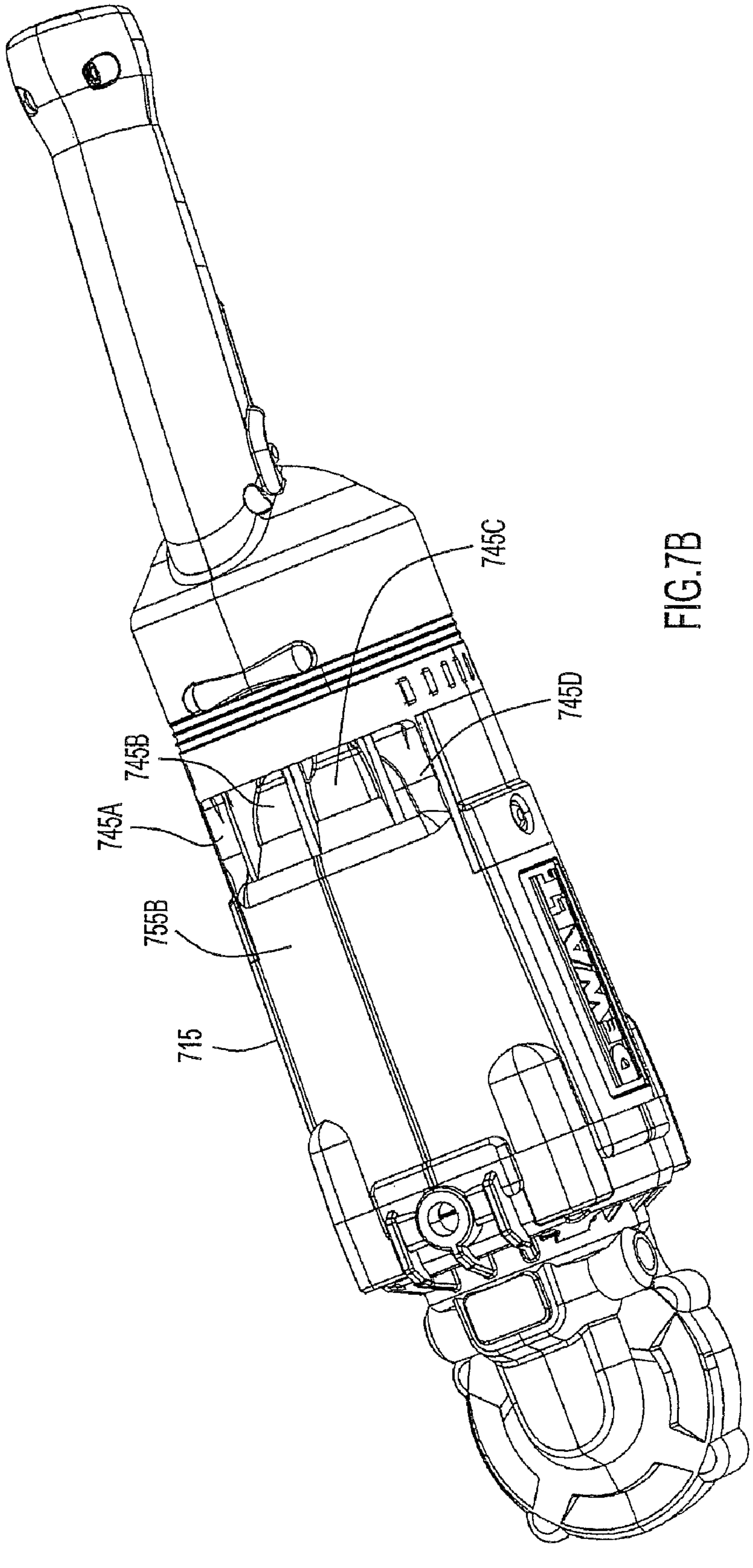
FIG. 7B illustrates a top perspective view of the power tool shown in FIG. 7A.
Figure 7C:
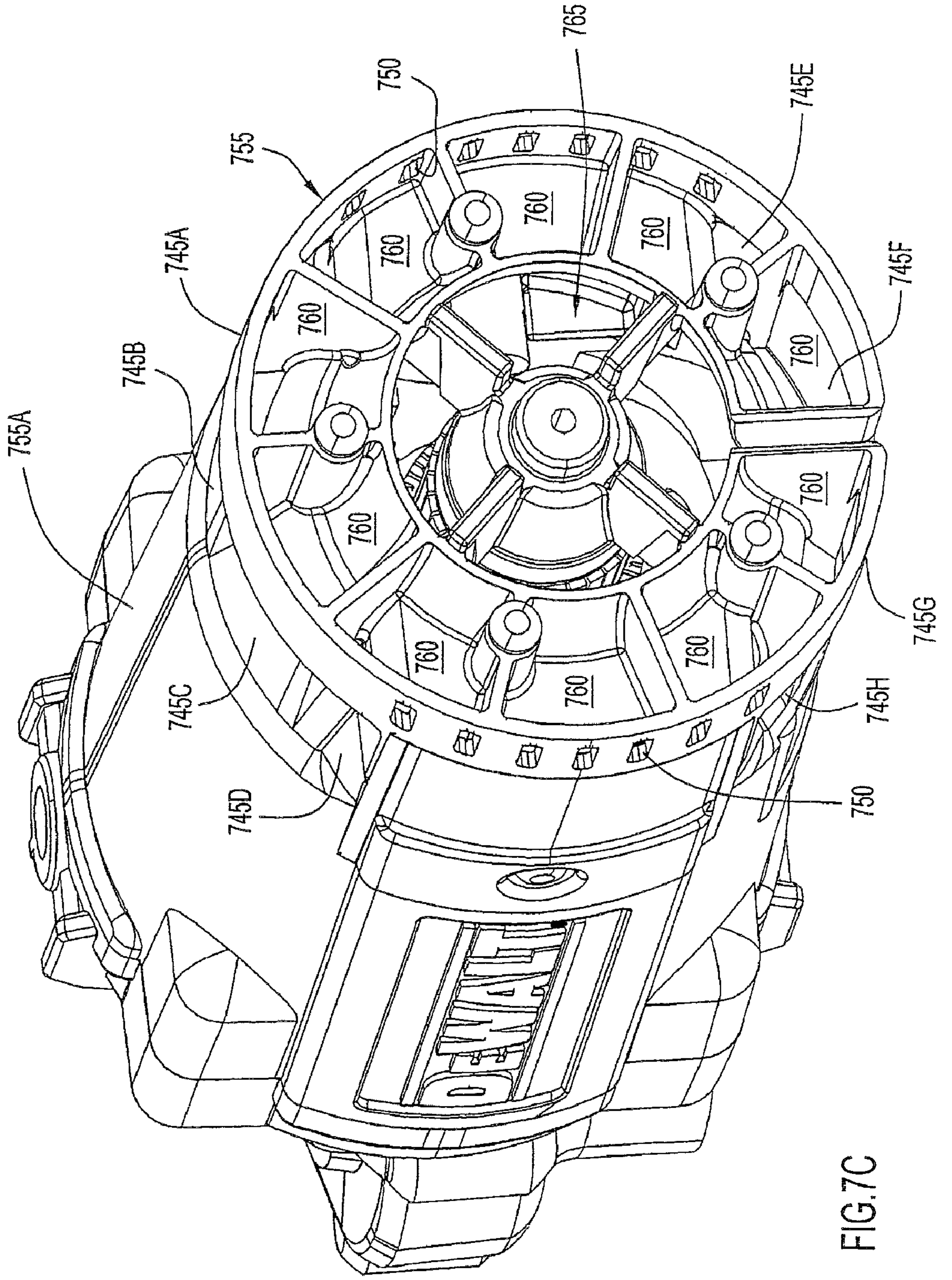
FIG. 7C illustrates a cross sectional view of the power tool taken along lines 7C-7C of FIG. 7A, showing the intake conduit.
Figure 7D:
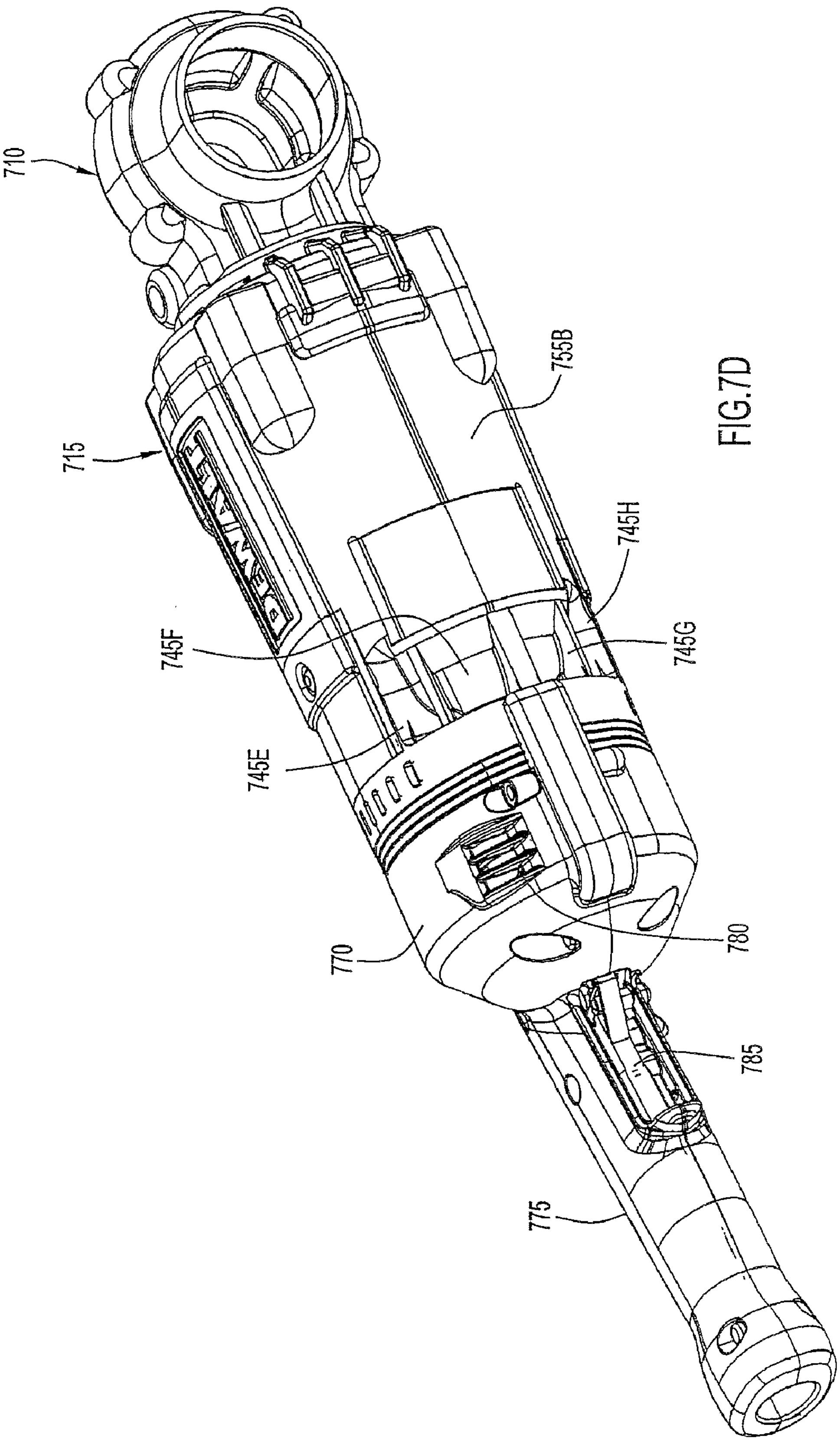
FIG. 7D illustrates a bottom perspective view of the power tool shown in FIG. 7A.
Figure 8:
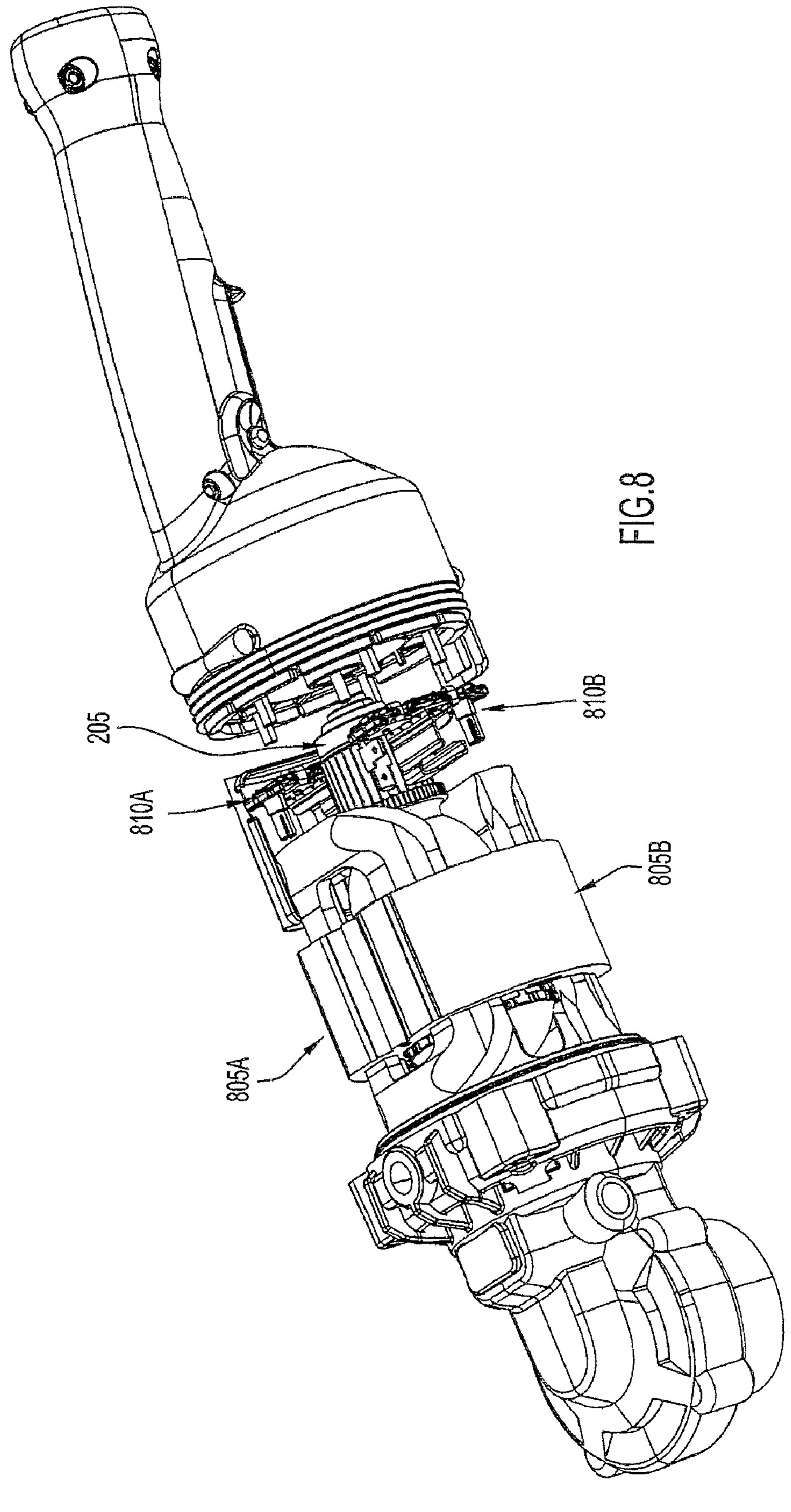
FIG. 8 illustrates a perspective view of the power tool shown in FIG. 7A, with a portion of the housing removed to show the motor assembly.

The above-described apparatus 10 may be utilized in a power tool such as an angle grinder. FIGS. 7-9 illustrate an angle grinder including the airflow apparatus in accordance with an embodiment of the present invention. Referring to FIGS. 7A-7C, the power tool 700 includes a housing 705 with a gear case 710, a field case 715 disposed rearward of the gear case, and a handle assembly 720 disposed rearward the field case. The housing 705 may further include an anti-vibration member 722 disposed at an intermediate location between the field case 715 and the handle assembly 720.

The gear case 710 houses the tool assembly 725, which includes the gear set that controls the tool (e.g., a grinder). The tool assembly 725 is driven by the motor assembly 105 and, in particular, driven by the motor shaft 215 (e.g., a grinder wheel spindle drives a grinder wheel, which, in turn, is driven by the motor shaft 215). The air generating assembly 110 is housed in the rear end of gear case 710 immediately forward of housing 705. The gear case 710 further includes one or more forward facing housing vents 730 defined by radially spaced openings. Vents 730 direct the airstream created by the driven fan 305 out of the gear case 710 and toward the tool assembly 725.

The field case 715 houses the motor assembly 105. Referring to FIG. 8, the field case 715 houses the rotor 205, as well as one or more brush assemblies 805A, 805B positioned to contact the conductive segments 210A disposed on the first rotor portion 207 and one or more brush holder assemblies 810A, 810B positioned to contact the conductive segments 210B disposed on the second rotor portion 212.

The field case 715 further includes one or more air intake vents operable to permit passage of ambient air from outside the housing into the housing interior, e.g., air that is drawn into the housing 705 due to the airflow generated by the driven fan 305 (i.e., via the negative pressure created by the airflow generation assembly 110). Referring back to FIG. 7B, the field case 715 may include one or more primary intake vents 745 located proximate the rearward end of the field case. In the embodiment shown, the field case 715 includes a first set of primary intake vents 745A, 745B, 745C, 745D disposed on an upper portion 755A of the housing 705 and a second set of primary intake vents 745E, 745F, 745G, 745H disposed on a lower portion 755B of the housing. The primary intake vents may be elongated channels that decline from the outer surface of the housing toward the housing interior. In addition, the field case 715 may further include one or more secondary intake vents 750 (a secondary intake vent may be configured to draw in a different volume (e.g., less) air volume compared with a primary intake vent 745). By way of example, the secondary intake vents 750 include a plurality of angularly spaced apertures disposed at predetermined radial locations on the housing 705.

The intake vents 745, 750 cooperate to direct air into the particle dispersion assembly 115. Referring to FIG. 7C, each of the primary 745 and secondary 750 intake vents may be in fluid communication with an intake conduit 755 configured to channel the intake air directly into the particle dispersion assembly 115. As shown, the intake conduit 755 is disposed within the field case, proximate the anti-vibration member 722. the intake conduit 755 possesses a generally annular structure defined by a plurality of air chambers 760 radially spaced about the structure to define a central passage 765 in fluid communication with the area of the housing that contains motor assembly 105. The central passage 765 may be generally coaxial with the axis of the motor shaft 215. Each chamber 760 is configured to direct the flow of the intake air (entering via the primary 745 or secondary 750 intake vents) directly into the vents 640 of the baffle 410. That is, each of the primary 745 and secondary 750 intake vents are in fluid communication with one or more of the chambers 760, which in turn, directly feed the baffle vents 640. With this configuration, particle-laden intake air is prevented from immediately entering the area of the field case 715 that houses the motor assembly 105. Instead, the intake air must first pass through the particle dispersion assembly 115 before being redirected toward the motor assembly 105.

The handle assembly 720 includes a cover portion 770 and a gripping portion 775. The portions 770, 775 may be separated and/or fluidly sealed from each other via wall 900 (FIG. 9). The cover portion 770 may include one or more discharge ports configured to permit the expulsion of particulates from the housing 705. As best seen in FIG. 7D, the cover portion 770 includes a discharge port or exhaust vent 780 positioned along the lower housing portion 755B. The exhaust vent 780 is positioned along the housing 705 such that it is generally aligned with the radial blade portions 525 of the particle dispersion assembly 115. With this configuration, particles deflected by the hook 530 of the passive fan 405 are directed toward the discharge port 780, thereby exiting the housing 705. The gripping portion 775 of the handle assembly 720 may include one or more control actuators 785 such as an on/off switch.

An exemplary power tool usable with the airflow apparatus is disclosed in Patent Application Publication U.S. 2006/

0267114 to Gallagher et al., the disclosure of which was previously incorporated herein by reference in its entirety.

Figure 9A:
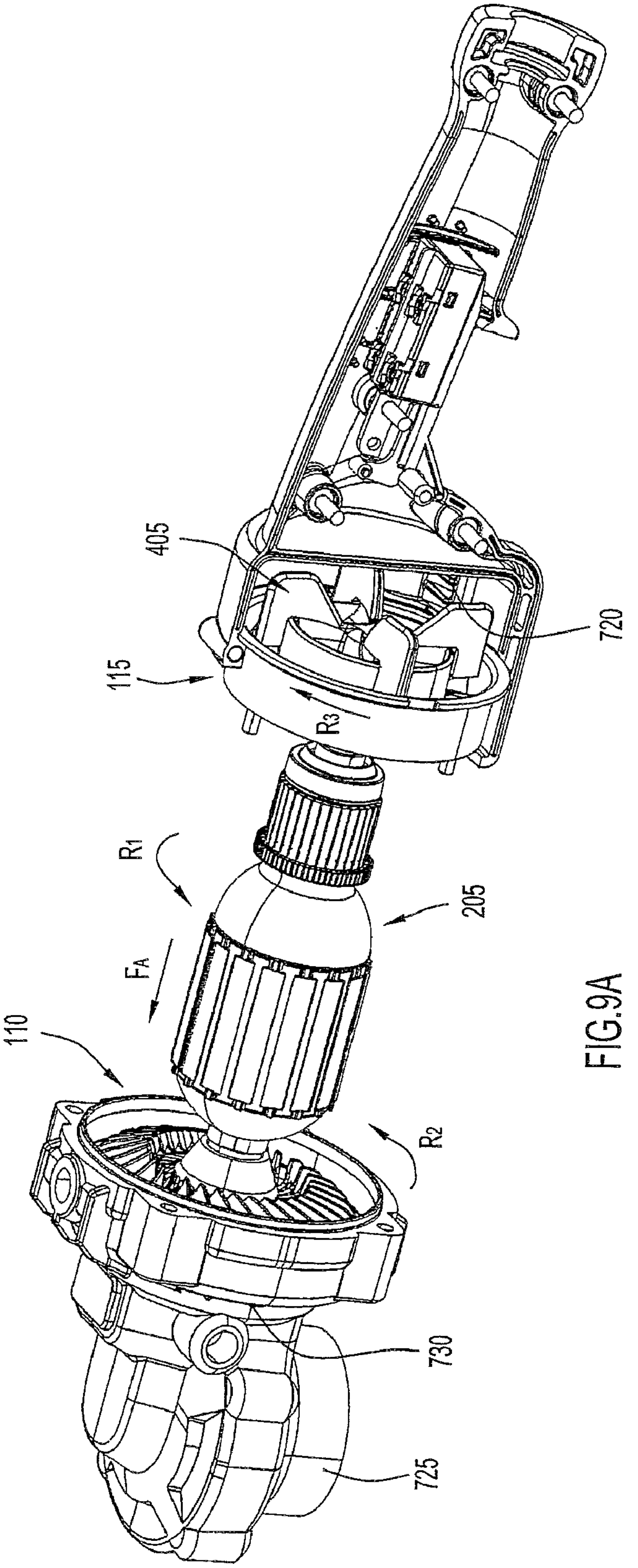
FIG. 9A illustrates a perspective view of the power tool shown in FIG. 7A with selected portions of its housing removed to show the operation of the airflow apparatus.
Figure 9B:
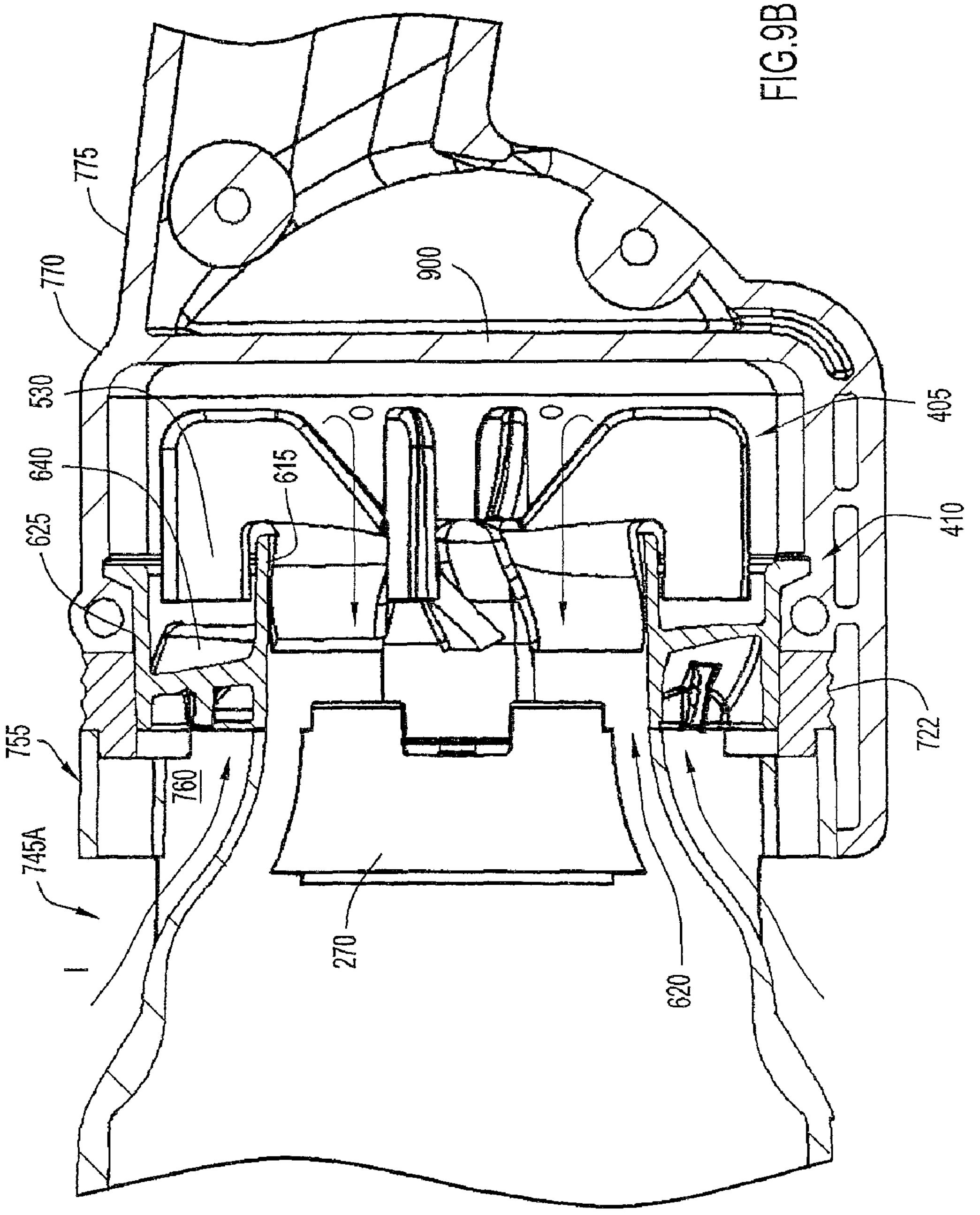
FIG. 9B illustrates a partial cross sectional view of the power tool shown in FIG. 7A, showing airflow movement within the power tool.
Figure 9C:
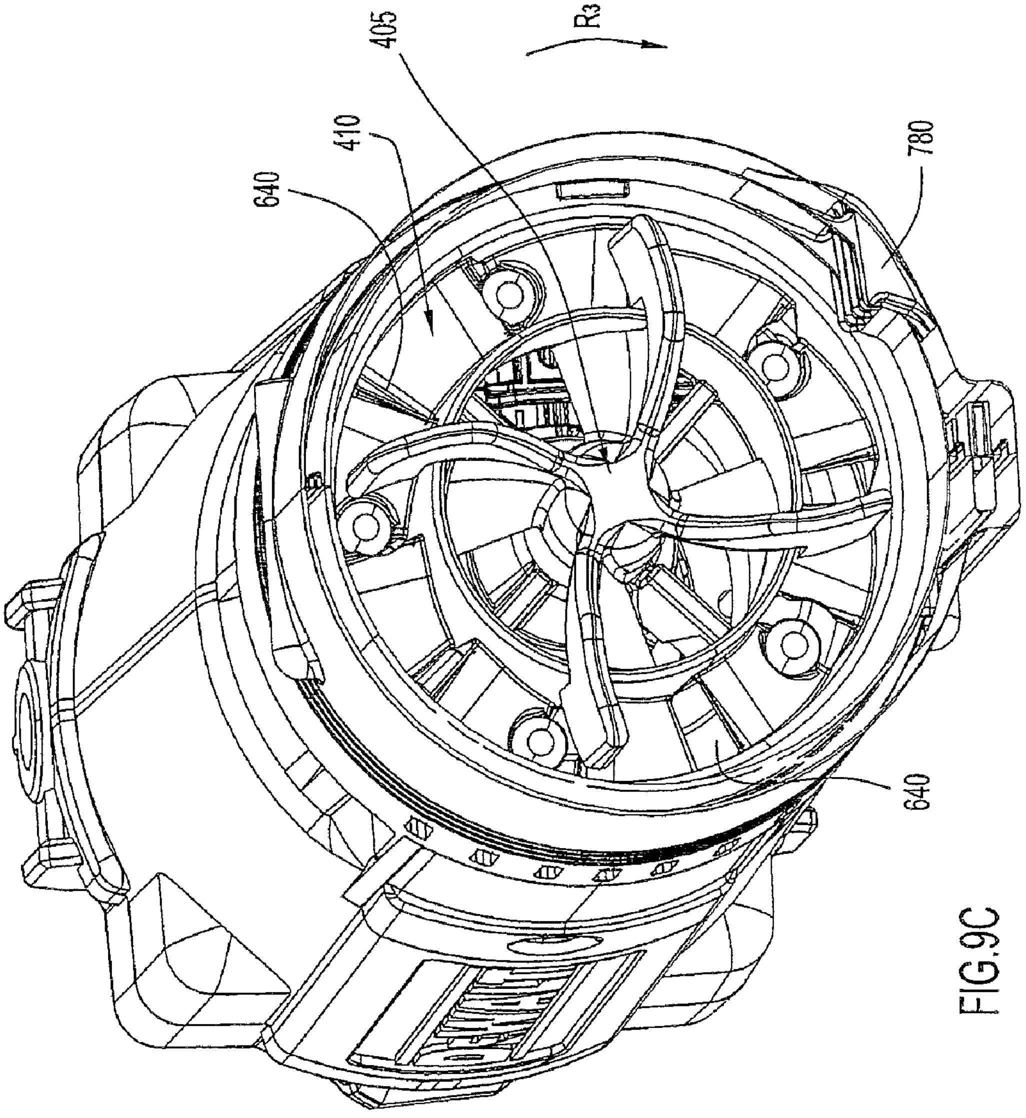
FIG. 9C illustrates a cross sectional view of the power tool taken along lines 9C-9C of FIG. 7A, showing the operation of the particle dispersion assembly.

The operation of the power tool is explained with reference to FIGS. 9A-9C. The motor assembly 105 is engaged (e.g., via actuator 785), rotating the rotor 205 about its axis (indicated by arrow $R_1$), which, in turn, rotates the motor shaft 215. The rotation of the shaft 215 drives the airflow generation assembly 110 by rotating the driven fan 305 (indicated by arrow $R_2$), which generates a forward airstream (indicated by arrow $F_A$). Specifically, a stream of air is directed axially out through the forward housing vents 730. This air may be utilized to cool the tool assembly 725 and its components. As explained above, the passive fan 405 of the particle dispersion assembly 115 is not mechanically or electrically connected driven by the motor assembly 105. That is, the passive fan 405 is not fixed to the motor shaft 215 such that rotation of the shaft created rotation of the passive fan. Consequently, rotation of the motor shaft 215 does not directly rotate the passive fan 405. Instead, the axial flow of the air generated by the active fan 305 causes passive fan rotation (indicated by arrow $R_3$).

This forward flow of air $F_A$, moreover, generates a negative pressure within the housing 705, causing air from outside the housing to be drawn into the housing through the primary 745 and secondary 750 intake vents. Referring the FIG. 9B, ambient air is drawn in as intake air (indicated by arrow I) through the primary 745 and secondary 750 intake vents. The intake air I includes particulate material (e.g., dirt, sawdust, metal dust, etc.) that, should it enter the portion of the field case 715 housing the motor assembly 105, could cause harm to the motor assembly. This intake air I is directed, via the intake conduit 755 rearward into the baffle 410, entering the cover portion 770 of the housing 705 via the baffle vents 640. The baffle vents 640, in turn, direct the intake air I into the baffle channel 630 such that the flow is directed clockwise (from the viewpoint of FIG. 9C). The airflow contacts the radial blade portion 525 of the deflection blades 515, rotating the passive fan 405 (in a clockwise direction from the viewpoint of FIG. 9C).

Once rotating, the radial blade portion 525 directs particles radially outward. As explained above, the deflection blades 515 contact the particles, sweeping them toward the discharge port 780. The blades 515, furthermore, generate forces sufficient to drive the particles radially outward and/or deflect the particles toward the discharge port 780. Rotation of the blades 505 further generates an axial flow through the baffle aperture 620. As a result, the flow of the cleaned intake air is redirected forward, being drawn through the central aperture 620 of the baffle 410 by the axial blade portions 520 (indicated by arrows O) and directed downstream toward the motor assembly 105.

While the present invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents. It is to be understood that terms such as “top”, “bottom”, “front”, “rear”, “side”, “height”, “length”, “width”, “upper”, “lower”, “interior”, “exterior”, and the like as may be used herein, merely describe points of reference and do not limit the present invention to any particular orientation or configuration.

We claim:

1. A power tool comprising:
a housing;
a tool assembly including:
a tool device operable to act on a work surface, and
a gear assembly operable to drive the tool device;
an airflow generating assembly operable to generate a flow of air through the housing, the airflow generating assembly comprising an airflow baffle and a driven fan;
a motor assembly comprising a rotor and a shaft driven by the motor, wherein the shaft is mechanically coupled to both the airflow generation assembly and the tool assembly such that rotation of the shaft engages the tool device and rotates the driven fan to generate the housing airflow; and
a particle dispersion assembly comprising a baffle and a passive fan operable to deflect particles traveling through the particle dispersion assembly.

2. The power tool of claim 1, wherein:
the housing comprises an intake vent that permits air from an ambient environment to enter the housing as intake air;
the airflow generated by the driven fan draws the intake air into the housing; and
the intake air drives passive fan.

3. The power tool of claim 2, wherein:
the housing includes a forward end and a rearward end;
the intake vent directs flow of intake air toward the rearward housing end and toward the particle dispersion assembly; and
the particle dispersion assembly redirects the flow of intake air toward the forward housing end.

4. The power tool of claim 2 further comprising an intake conduit disposed along the housing, wherein the intake conduit is operable to direct the flow of intake air from the intake vent into the baffle of the particle dispersion assembly.

5. The power tool of claim 4, wherein:
the housing comprises a plurality of intake vents;
the baffle of the particle dispersion assembly includes a plurality of baffle vents;
the intake conduit comprises an annular structure including a plurality of angularly spaced chambers, each chamber being in fluid communication with at least one of the plurality of intake vents; and
each chamber is further in fluid communication with at least one of the plurality of baffle vents.

6. The power tool of claim 5, wherein the housing comprises:
a plurality of primary intake vents, each vent comprising an elongated channel inclining toward the particle dispersion assembly;
a plurality of secondary intake vents angular spaced along the housing and generally aligned with the intake conduit; and
the plurality of intake conduit chambers is in fluid communication with both the primary and secondary intake vents.

7. The power tool of claim 1, wherein the housing further comprises a discharge port configured to permit particles removed from the intake air by the passive fan to exit the housing.

8. The power tool of claim 1, wherein the passive fan comprises a hub and a plurality of deflection blades extending distally from the hub, wherein each deflection blade comprises an axial portion extending generally axially along the hub and a radial portion extending radially from the hub.

9. The power tool of claim 1, wherein the power tool is an angle grinder.

10. A power tool comprising:

a housing including an intake vent that permits air from an ambient environment to enter the housing as intake air;

a tool assembly including:

a tool device operable to act on a work surface, and a gear assembly operable to drive the tool device;

an airflow generating assembly operable to generate airflow through the housing, the airflow generating assembly comprising an airflow baffle and a driven fan;

a motor assembly comprising a rotor and a shaft driven by the motor, wherein the shaft is mechanically coupled to both the airflow generation assembly and the tool assembly such that rotation of the shaft engages the tool device and rotates the driven fan to generate the housing airflow;

a particle dispersion assembly comprising a baffle and a passive fan operable to deflect particles traveling through the particle dispersion assembly, the passive fan comprising a hub and a plurality of deflection blades extending distally from the hub, wherein each deflection blade comprises an axial portion extending generally axially along the hub and a radial portion extending radially from the hub; and an intake conduit disposed along the housing, wherein the intake conduit is operable to direct the flow of intake air from the intake vent into the baffle of the particle dispersion assembly.

11. The power tool of claim 10, wherein:

the power tool is an angle grinder;

the housing comprises a plurality of primary intake vents and a plurality of secondary intake vents;

the particle dispersion assembly includes a plurality of baffle vents;

the intake conduit comprises an annular structure including a plurality of angularly spaced chambers, each chamber being in fluid communication with at least one of the plurality of baffle vents; and the plurality of intake conduit chambers is in fluid communication with both the primary and secondary intake vents.

12. A particle evacuation system for a power tool, the system comprising:

a housing defining a housing interior, the housing including:

a forward end and a rearward end, a an air intake vent operable to permit passage of air from outside the housing into the housing interior, a particle exhaust port configured to permit the passage of particulate material from the housing interior;

a motor assembly disposed within the housing interior, the motor assembly including a rotating shaft operable to drive a tool;

an airflow generating assembly disposed within the housing interior, the airflow generating assembly including a driven fan, wherein the motor assembly drives the rotation of the driven fan to generate airflow within the housing sufficient to draw intake air through the intake vent;

a particle dispersion assembly disposed within the housing interior, the particle dispersion assembly including a passive fan operable to deflect particulate material present within the intake air, wherein rotation of the passive fan is driven by the flow of intake air entering the housing; and an intake conduit disposed within the housing interior, the intake conduit in fluid communication with each of the intake vent and the particle dispersion assembly, wherein the intake conduit directs air entering via the intake vent directly to the particle dispersion assembly.

13. The particle evacuation system of claim 12, wherein the rotational axis of the driven fan is generally coaxial with the rotational axis of the passive fan.

14. The particle evacuation system of claim 12, wherein:

the passive fan comprises a hub and a plurality of deflection blades extending distally from the hub; and the deflection blades comprise an axial portion extending generally axially along the hub and a radial portion extending radially from the hub.

15. The particle evacuation system of claim 14, wherein:

the radial blade portion comprises a proximal end and a distal end; and the distal end of the radial blade portion forms a hook extending axially with respect to the hub.

16. The particle evacuation system of claim 15, wherein:

the particle dispersion assembly further includes a baffle comprising:

an inner wall defining an aperture, an outer wall spaced from an surrounding the inner wall, the inner and outer walls defining a gap; and the axial blade portion moves within the aperture of the baffle; and the hook of the radial blade portion moves within the gap defined by the inner and outer walls.

17. The particle evacuation system of claim 16, wherein the baffle comprises a plurality of vents oriented is spaced relation along the defined gap.

18. The particle evacuation system of claim 12, wherein the particle dispersion assembly further comprises a bearing assembly including a pin defining the rotational axis of the passive fan and a plurality of bearings mounted on the pin.

19. The particle evacuation system of claim 12, wherein the intake conduit comprises an annular structure including a plurality of angularly spaced chambers.

20. The particle evacuation assembly of claim 12, wherein:

the particle dispersion assembly comprises a baffle including a central aperture and a plurality of baffle vents angularly spaced about the central aperture;

each chamber of the intake conduit is in fluid communication with at least one baffle vent.

21. The particle evacuation system of claim 12, wherein:

the housing comprises a plurality of intake vents;

the particle dispersion assembly further includes a baffle comprising a plurality of baffle vents;

the intake conduit comprises an annular structure including a plurality of angularly spaced chambers, each chamber being in fluid communication with at least one of the plurality of intake vents and at least one of the plurality of baffle vents.

22. The particle evacuation system of claim 21, wherein:

the housing includes a forward end and a rearward end; and the intake vent directs the intake airflow toward the rearward housing end and into the intake conduit; and the particle dispersion assembly redirects the intake airflow toward the forward housing end and toward the motor assembly.

* * * * *